(12) United States Patent
Day

(10) Patent No.: US 9,423,518 B2
(45) Date of Patent: Aug. 23, 2016

(54) METHOD FOR PROCESSING DUAL-SENSOR STREAMER DATA WITH ANTI-ALIAS PROTECTION

(75) Inventor: Anthony James Day, Drammen (NO)

(73) Assignee: PGS GEOPHYSICAL AS, Oslo (NO)

( * ) Notice: Subject to any disclaimer, the term of this patent is extended or adjusted under 35 U.S.C. 154(b) by 1144 days.

(21) Appl. No.: 13/369,764

(22) Filed: Feb. 9, 2012

(65) Prior Publication Data

US 2013/0208566 A1 Aug. 15, 2013

(51) Int. Cl.
*G01V 1/38* (2006.01)
*G01V 1/36* (2006.01)
(52) U.S. Cl.
CPC . *G01V 1/364* (2013.01); *G01V 1/38* (2013.01); *G01V 2210/242* (2013.01)
(58) Field of Classification Search
CPC .... G01V 1/364; G01V 1/38; G01V 2210/242
See application file for complete search history.

(56) References Cited

U.S. PATENT DOCUMENTS

| 7,359,283 B2 * | 4/2008 | Vaage | G01V 1/3808 367/15 |
| 2009/0231956 A1 * | 9/2009 | Schonewille | G01V 1/36 367/46 |
| 2010/0211319 A1 | 8/2010 | van Manen et al. | |

FOREIGN PATENT DOCUMENTS

EP 2081054 A2 7/2009

OTHER PUBLICATIONS

Mexican Intellectual Propert Office Search Report mailed on May 9, 2014, and issued for application No. MX/a/2013/001596, filed Feb. 8, 2013, 2 pages.
English Translation of Mexican Intellectual Property Office Search Report mailed on May 9, 2014, and issued for application No. MX/a/2013/001596, filed Feb. 8, 2013, 2 pages.
Search Report, Application No. 13154556.8 EP, Oct. 120, 2015.

* cited by examiner

*Primary Examiner* — Krystine Breier

(57) ABSTRACT

Dual-sensor seismic data are separated into aliased and unaliased parts in a frequency-wavenumber domain. The seismic data in the unaliased part are processed using a conventional vertical wavenumber. The seismic data in the aliased part are processed using an alternative vertical wavenumber additionally based on a Nyquist wavenumber for the seismic data. The processed unaliased seismic data and the processed aliased seismic data are combined.

18 Claims, 17 Drawing Sheets

METHOD FOR PROCESSING DUAL-SENSOR STREAMER DATA WITH ANTI-ALIAS PROTECTION

BACKGROUND

In the oil and gas industry, geophysical prospecting is commonly used to aid in the search for and evaluation of subsurface earth formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes. The seismic sensors generate signals, typically electrical or optical, from the detected seismic energy, which are recorded for further processing.

The appropriate seismic sources for generating the seismic signal in land seismic surveys may include explosives or vibrators. Marine seismic surveys typically employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most typically, an air gun. Typically, a marine seismic source consists not of a single source element, but of a spatially-distributed array of source elements. This arrangement is particularly true for air guns, currently the most common form of marine seismic source.

The appropriate types of seismic sensors typically include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle motion sensors may be deployed together in a marine survey, collocated in pairs or pairs of arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and returning from reflective interfaces.

It is well known in the art that pressure and particle motion signals can be combined to derive both the up-going and the down-going wavefield. For sea floor recordings, the up-going and down-going wavefields may subsequently be combined to remove the effect of the surface reflection and to attenuate water borne multiples in the seismic signal.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION

Figure 1:
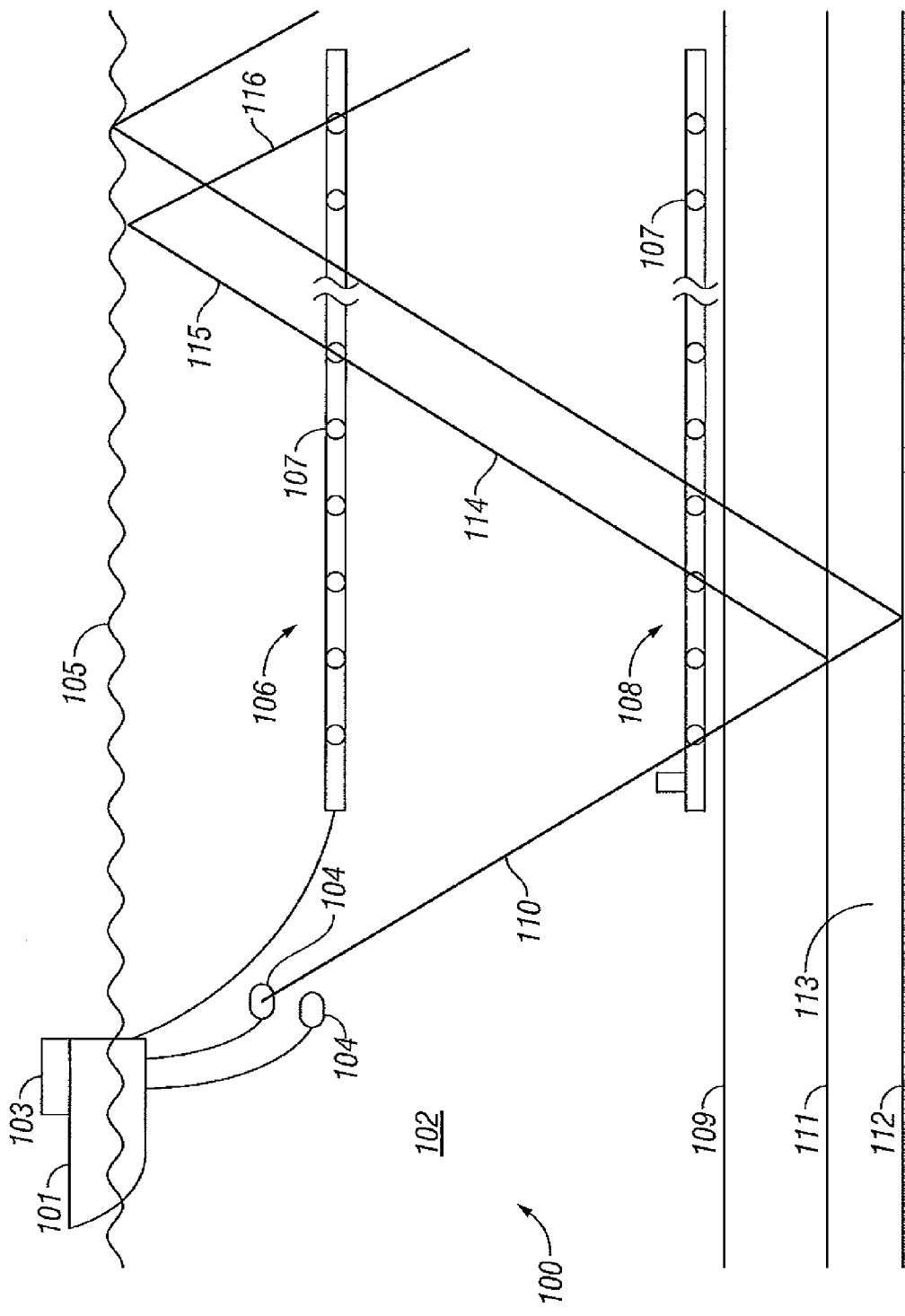
FIG. 1 is a diagram of an exemplary system for acquiring seismic data that can be used with seismic data processing methods according to the invention.

FIG. 1 is a diagram of an exemplary system for acquiring seismic data that can be used with seismic data processing methods according to the invention. In various embodiments, a single seismic sensor cable (also called a seismic streamer) or a single ocean bottom cable are shown for simplicity of illustration. This illustration of one cable is only meant to more clearly demonstrate principles of the invention and is not intended as a limitation of the invention.

In FIG. 1, the seismic acquisition system is designated generally as 100. A seismic vessel 101 is disposed in a body of water 102 and carries equipment 103 for navigation, seismic source control, and seismic sensor recording. The seismic vessel 101 or another service vessel (not shown) tows seismic sources 104 through the body of water 102 below the surface 105 of the water. Two seismic sources 104 at different depths are illustrated here in FIG. 4. The seismic sources 104 comprise any appropriate type of source, typically in arrays. The configuration of seismic sources 104 illustrated is not intended to be a limitation of the invention.

In one embodiment, the seismic vessel 101 or another service vessel (not shown) tows a seismic streamer 106 through the body of water 102. The seismic streamer 106 comprises seismic sensors 107 at spaced apart positions along the seismic streamer 106, so that the seismic streamer 106 containing the seismic sensors 107 is disposed in the body of water 102. The seismic sensors 107 are typically pressure sensors, such as hydrophones. In another embodiment, the seismic streamer 106 comprises a dual-sensor streamer, in which the seismic sensors 107 comprise pairs of collocated pressure and particle motion sensors. The particle motion sensors are typically particle velocity sensors, such as geophones, or accelerometers. The seismic sensors 107 typically comprise arrays of sensors at each spaced apart position. An alternative to having the pressure and particle motion sensors co-located is to have sufficient spatial density of sensors so that the respective wavefields recorded by the pressure and particle motion sensors can be interpolated or extrapolated to produce the two wavefield signals at the same location.

In another embodiment, the seismic vessel 101 or another service vessel (not shown) disposes an ocean bottom cable 108 on the water bottom 109. The ocean bottom cable 108 also comprises seismic sensors 107 at spaced apart positions along the cable, also typically in arrays of sensors at each spaced apart position. The seismic sensors 107 in the ocean bottom sensor 108 can also comprise pairs of pressure and particle motion sensors. In yet another embodiment, both seismic streamers 106 and ocean bottom cable 108 are employed. The type of sensors illustrated in the seismic acquisition system 100 is not intended to be a limitation of the invention. For example, in other embodiments, discrete seismic sensors 107 located at ocean bottom nodes (not shown) could be included in the seismic acquisition system 100.

When the seismic sources 104 are activated, acoustic energy travels downwardly, at 110, through the body of water 102 and the water bottom 109 to layer boundaries, such as 111 and 112, surrounding a subterranean formation layer, such as 113. A portion of the acoustic energy is reflected from the layer boundary at 111 and travels upwardly, at 114. The upwardly traveling acoustic energy 114 is detected at seismic sensors 107 on the ocean bottom cable 108 or the seismic streamer 106. The upwardly traveling acoustic energy continues upward, at 115, until reflecting off the water surface 105 and then travels downwardly again, at 116. The downwardly traveling acoustic energy 116 may be detected again by seismic sensors 107 on the seismic streamer 106 or the ocean bottom cable 108, resulting in a ghost signal. The acoustic energy detected at the seismic sensors 107 may be recorded onto any type of appropriate storage media at any location, such as, but not restricted to, at the seismic streamer 106 or the ocean bottom cable 108, on the seismic vessel 101 or another service vessel, or onshore.

Figure 2:
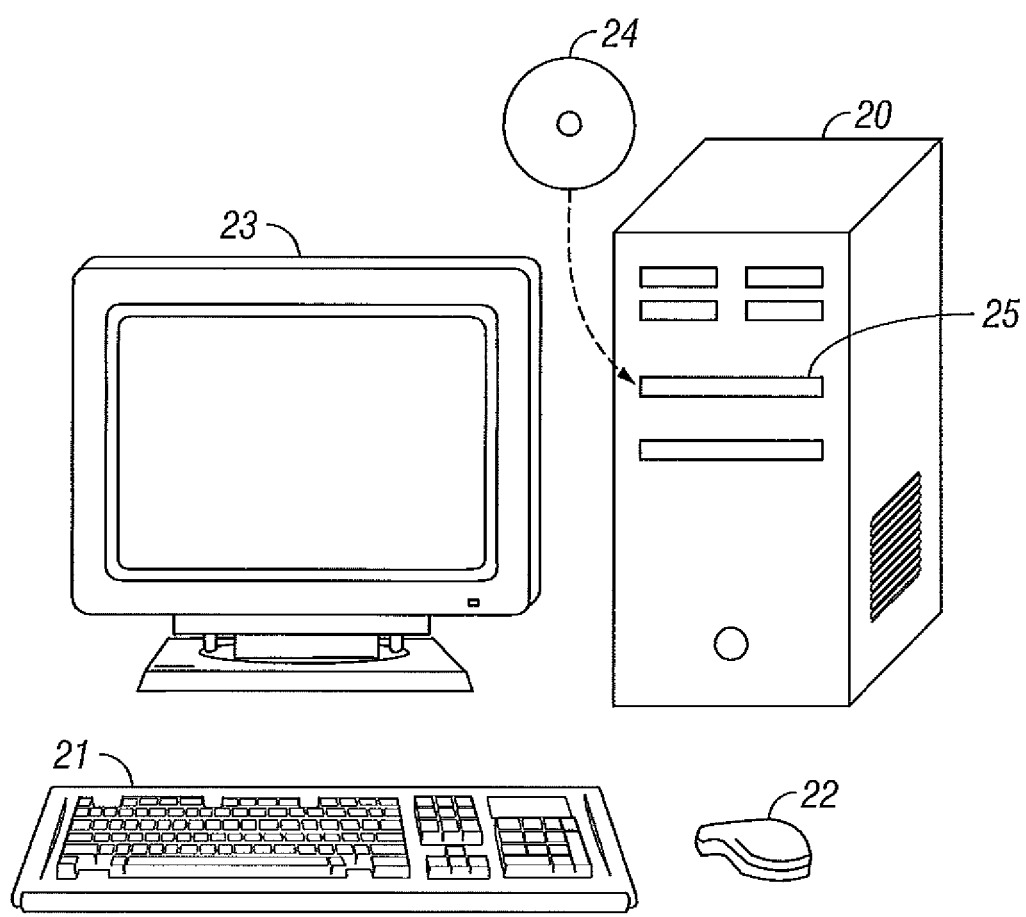
FIG. 2 is a diagram illustrating, by way of example, one of many different types of computer systems that can be used with seismic data processing methods according to the invention.

FIG. 2 is a diagram illustrating, by way of example, one of many different types of computer systems that can be used with seismic data processing methods according to the invention. A central processor 20 is coupled to user input devices, such as a keyboard 21 (wired or wireless) and a mouse 22 (wired or wireless). The processor 20 is further coupled to a display, such as a monitor 23. A computer program according to the invention may reside on any of a number of computer readable media, such as a disk 24 insertable into a disk drive 25 or on an internal or external hard drive (not shown).

A recorded seismic wavefield is typically sampled at discrete locations which results in spatial aliasing. Energy at spatial wavenumbers higher than the Nyquist wavenumber, which is determined by the sensor separation in each direction independently, will be mapped to an incorrect wavenumber when multi-channel processing methods are applied. Consequently spatially aliased energy will not generally be handled correctly by such processing methods due to this ambiguity in the spatial wavenumber. Common methods for dealing with this problem include assuming that there is no aliased energy, or identifying and removing the aliased energy before applying multi-channel processing. Both of these approaches degrade the accuracy of the output. Thus, a need exists for a method for handling spatial aliasing in seismic data processing; especially a method that can take advantage of dual-sensor data.

Figure 3:
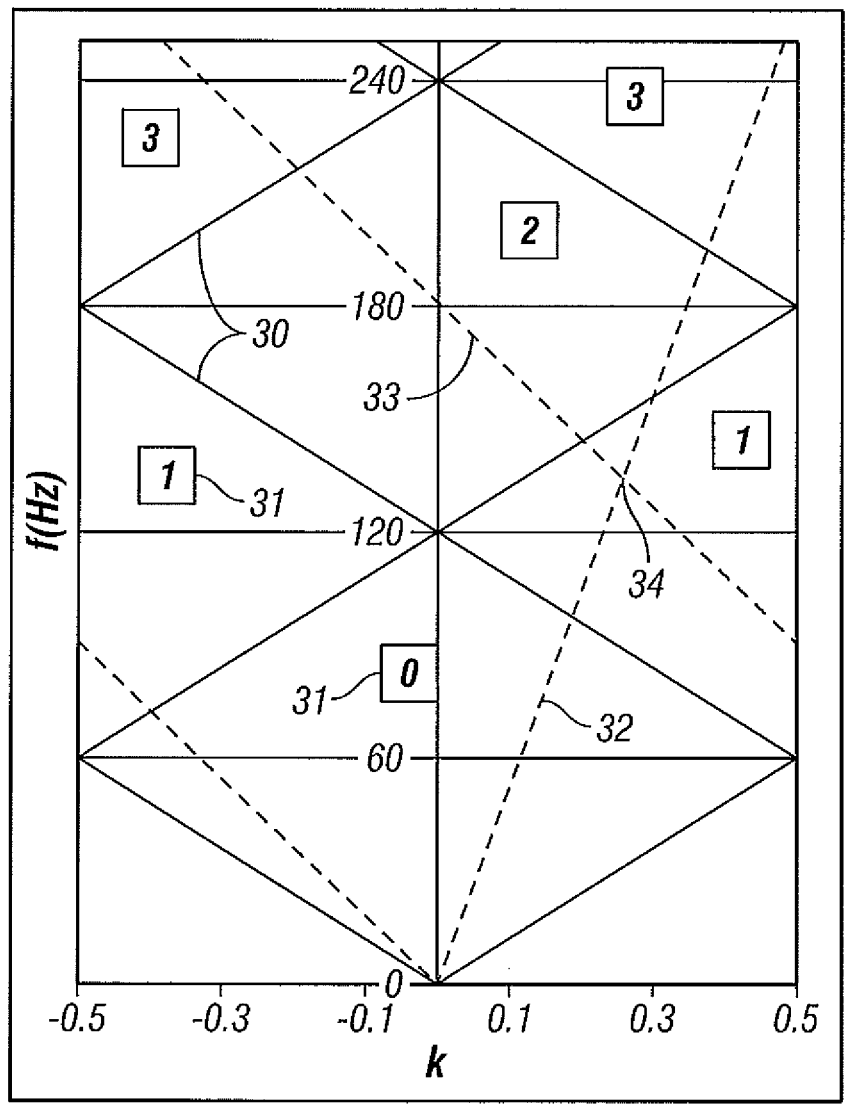
FIG. 3 is a plot of two plane wave events in a f-$k_x$ domain.

Processing of seismic data from dual-sensor streamers, which includes low-frequency reconstruction of geophone signals (LFC), wavefield separation, and redatuming, is typically performed in the frequency-wavenumber (f-k) domain in order to deal with seismic events with any emergence angle, and in particular, high emergence angles. Each point in f-k space corresponds to a particular emergence angle. However, for aliased energy this emergence angle is in error. The problem is illustrated in FIG. 3 for a 2-D acquisition geometry, which shows a plot of two plane wave events in a f-$k_x$ domain.

Solid black lines 30 are events with velocity 1500 m/s, the nominal speed of sound in water. In practice, a user-specified water velocity based on the best available measurement would be used to identify the region where aliasing occurs rather than the nominal 1500 m/s used here in FIG. 3 for merely illustrative purposes. Numbers in boxes 31 are the maximum order of aliasing in each region. A first event 32 and a second event 33 cross at a point 34 where the maximum aliasing order is 1. The first event 32 is not aliased, and so will be processed correctly. However, the second event 33 will only be processed correctly up to the temporal frequency that corresponds to the Nyquist wavenumber for an event at that particular emergence angle. In processing data from dual-sensor streamers, the obliquity term is typically parameterized as a $k_z$ term, where $k_z$ is the vertical component of the angular wavenumber vector.

When performing wavefield separation or other seismic processing, different values of $k_z$ should be used for the two events 32, 33 for correct scaling at the cross-over point 34. For example, the obliquity factor for a constant velocity water column can be defined in the frequency-wavenumber domain as $$\frac{\rho\omega}{k_z},$$

where $\rho$ is water density, $\omega$ is circular frequency, and $k_z$ is the vertical component of the circular wavenumber vector.

The vertical wavenumber $k_z$ is calculated at each point in f-k space. However, if spatially aliased energy is present at a particular f-k location, the value of $k_z$ that is used is systematically too large for the aliased part. This leads to incorrect treatment of the aliased energy in dual-sensor data processing.

For the 2-D example illustrated in FIG. 3, at the point 34 where the first event 32 and the second event 33 cross, the obliquity term that will be used in conventional dual-sensor streamer would use the conventional vertical wavenumber, designated here as $k_{z0}$:

$$k_{z0} = \sqrt{\left(\frac{\omega}{c}\right)^2 - k_x^2}, \quad (1a)$$

where c is the speed of sound in water and $k_x$ is a horizontal wavenumber. Conventionally, $k_x$ is in the inline direction, that is, parallel to the towed streamers. In the 3-D case, the expression corresponding to Equation (1a) is given by:

$$k_{z0} = \sqrt{\left(\frac{\omega}{c}\right)^2 - k_x^2 - k_y^2}, \quad (1b)$$

where $k_y$ is a horizontal wavenumber orthogonal to $k_x$. Thus, conventionally, $k_y$ is in the crossline direction, that is, perpendicular to the towed streamers.

Equations (1a) and (1b) are correct for the first event 32, but the obliquity factor that should be used for the second event 33 should use the following alternative vertical wavenumber of the invention, designated here as $k_{z1}$:

$$k_{z1} = \sqrt{\left(\frac{\omega}{c}\right)^2 - (2k_{Ny} - |k_x|)^2}, \quad (2a)$$

where $k_{Ny}$ is the Nyquist wavenumber for the recorded seismic data. In the 3-D case, the expression corresponding to Equation (2a) is given by:

$$k_{z1} = \sqrt{\left(\frac{\omega}{c}\right)^2 - (2k_{Ny-x} - |k_x|)^2 - (2k_{Ny-y} - |k_y|)^2}, \quad (2b)$$

where $k_{Ny-x}$ and $k_{Ny-y}$ are Nyquist wavenumbers in the inline and crossline directions, respectively. These Nyquist wavenumbers may take different values if the inline and crossline sampling intervals are different, as they typically are.

The invention is a method for producing correct emergence angles for seismic processing in the presence of aliased energy. In the method of this invention, recorded seismic energy in the pressure and particle velocity records that maps to a particular point in f-k space is separated into aliased and unaliased parts. In particular, recorded seismic energy in the regions labeled 1 is separated into an unaliased part (designated by subscript "0") and a first-order aliased part (designated by subscript "1"). This separation is discussed below.

The recorded pressure data P can be expressed as a sum of an unaliased part $P_0$ and an aliased part $P_1$ by:

$$P = P_0 + P_1 \quad (3)$$

and the vertical particle velocity data V can be expressed as a sum of an unaliased part $V_0$ and an aliased part $V_1$ by:

$$V = V_0 + V_1. \quad (4)$$

The free surface condition is applied to the unaliased and aliased parts in Equations (3) and (4) independently, using the obliquity factors given by Equations (1a) or (1b), and (2a) or (2b), respectively. The free surface condition assumes that the pressure at the sea surface is zero. For illustrative purposes, the free surface condition will be applied to the case in which both the sea surface and the recording surface (cable containing the receivers) are flat and a known distance apart. By making this simple assumption, it is possible to illustrate an embodiment of the invention using simple algebraic expressions in the f-k domain. However, the invention does not require these assumptions about the sea surface and recording surface shape, as long as their relative positions are known. Applying the free surface condition yields:

$$\frac{k_{z0}}{\omega\rho}(1 + \exp[-2ik_{z0}z_R])P_0 = -(1 - \exp[-2ik_{z0}z_R])V_0 \quad (5)$$

and $$\frac{k_{z1}}{\omega\rho}(1 + \exp[-2ik_{z1}z_R])P_1 = -(1 - \exp[-2ik_{z1}z_R])V_1, \quad (6)$$

respectively, where $z_R$ is receiver depth.

Equations (3) to (6) yield a fully determined system of equations that can be solved to split the pressure and particle velocity records into aliased and unaliased parts. In other words, Equations (3) to (6) yield four linearly independent equations in the four unknowns $P_0$, $P_1$, $V_0$, and $V_1$ and thus can be solved uniquely.

The solution to the system of Equations (3) to (6) can be simplified by using the variable substitution:

$$\tilde{V} = \tilde{V}_0 + \tilde{V}_1 = -i\omega\rho V. \quad (7)$$

The substitution in Equation (7) allows one to rewrite the free surface condition in Equations (5) and (6) as:

$$k_{z0}\cos(k_{z0}z_R)P_0 = \sin(k_{z0}z_R)\tilde{V}_0 \quad (8)$$

and $$k_{z1}\cos(k_{z1}z_R)P_1 = \sin(k_{z1}z_R)\tilde{V}_1. \quad (9)$$

The solution to the four unknowns $P_0$, $P_1$, $\tilde{V}_0$, and $\tilde{V}_1$ in the four Equations (3), (7), (8), and (9) can then be expressed concisely in matrix notation as:

$$\begin{pmatrix} P_0 \\ P_1 \\ \tilde{V}_0 \\ \tilde{V}_1 \end{pmatrix} = \frac{1}{D}\begin{pmatrix} k_{z1}\sin(k_{z0}z_R)\cos(k_{z1}z_R) & -\sin(k_{z0}z_R)\sin(k_{z1}z_R) \\ -k_{z0}\cos(k_{z0}z_R)\sin(k_{z1}z_R) & \sin(k_{z0}z_R)\sin(k_{z1}z_R) \\ k_{z0}k_{z1}\cos(k_{z0}z_R)\cos(k_{z1}z_R) & -k_{z0}\cos(k_{z0}z_R)\sin(k_{z1}z_R) \\ -k_{z0}k_{z1}\cos(k_{z0}k_R)\cos(k_{z1}z_R) & k_{z1}\sin(k_{z0}z_R)\cos(k_{z1}z_R) \end{pmatrix}\begin{pmatrix} P \\ \tilde{V} \end{pmatrix}, \quad (10)$$

where the denominator factor D in Equation (10) is given by:

$$D = k_{z1}\sin(k_{z0}z_R)\cos(k_{z1}z_R) - k_{z0}\cos(k_{z0}z_R)\sin(k_{z1}z_R). \quad (11)$$

From Equation (11), when the denominator factor D=0, then:

$$k_{z1}\sin(k_{z0}z_R)\cos(k_{z1}z_R) = k_{z0}\cos(k_{z0}z_R)\sin(k_{z1}z_R). \quad (12)$$

It follows from Equation (12) that:

$$k_{z1}\cot(k_{z1}z_R) = k_{z0}\cot(k_{z0}z_R). \quad (13)$$

The representation of the five surface condition given by Equations (8) and (9) can then be rewritten as:

$$k_{z0}\cot(k_{z0}z_R)P_0 = \tilde{V}_0 \quad (14)$$

and $$k_{z1}\cot(k_{z1}z_R)P_1 = \tilde{V}_1. \quad (15)$$

By Equation (13), the cotangent term in either of Equations (14) or (15) can then be substituted for the cotangent term in the other equation.

Thus, when D=0, the relationship between pressure and particle velocity is the same for both the unaliased and aliased parts of the seismic energy. Hence it is not possible to use the free surface condition to separate them. This means that at these locations in f-k space, the system of equations being solved is underdetermined.

For values of the denominator factor D in Equation (11) close to zero, the solution of Equation (10) becomes unstable. In one embodiment, an attempt to prevent division by D≈0 in Equation (10) is given by:

for $|D|<\epsilon$, all energy is treated as unaliased. (16)

In an alternative embodiment, the following is used:

for $|D|<\epsilon$, all energy is treated as aliased, (17)

where $\epsilon$ is a small number chosen to provide a stable separation of aliased and unaliased energy. Exemplary appropriate values for r are 0.1 or 0.01.

A further effect that should be taken into account is the effect of receiver array responses, which are different for hydrophone and geophone arrays, since, for example, it is not possible to locate a hydrophone and a geophone at the same physical location in the cable. In one embodiment, a spatial filter is applied to the geophone data to match it to the hydrophone data. In an alternative embodiment, a spatial filter is applied to the hydrophone data to match it to the geophone data. In yet another embodiment, spatial filters are applied to both the geophone and hydrophone data to match them to each other. Equations (5) and (6), from which all subsequent relationships are derived, assume that suitable spatial filters have been applied to match the responses of the two sensors. However, this filter is correct for unaliased energy only. For 12.5 m trace spacing, aliasing begins at 0.04/m. Hence a correction factor must be built in to correct the array response for aliased energy.

For illustrative purposes, the method of accounting for differences in receiver array responses will be applied in the case in which both hydrophone and geophone receiver arrays comprise regularly spaced arrays of sensors. By making this simplification, it is possible to illustrate the invention using simple algebraic expressions. However, the invention does not require these assumptions about the array geometries, provided that the locations of the sensors making up each array are known, so that their transfer functions, and hence their responses, can be determined. Furthermore, for illustrative purposes, it is assumed that suitable spatial filters have been applied to one, the other, or both of the geophone and hydrophone data, to match the responses of the two sensor arrays.

The response A of an array of N receivers with regular receiver separation $\Delta x$ can be expressed as a function of horizontal wavenumber $k_x$ as follows:

$$A = \frac{1}{N}\left[\frac{\sin\left(\frac{N\Delta x k_x}{2}\right)}{\sin\left(\frac{\Delta x k_x}{2}\right)}\right] \quad (18)$$

When the pressure sensor (P) and velocity sensor (V) arrays comprise different numbers of sensors $N_p$ and $N_v$, respectively, with different receiver spacing $\Delta x_p$ and $\Delta x_v$, respectively, then the filter F that is applied to match the response of the velocity sensor array $A_v$ to the response of the pressure sensor array $A_p$ for unaliased energy is given by:

$$F = \frac{A_p}{A_v} = \frac{N_v}{N_p}\left[\frac{\sin\left(\frac{N_p\Delta x_p k_x}{2}\right)\sin\left(\frac{\Delta x_v k_x}{2}\right)}{\sin\left(\frac{N_v\Delta x_v k_x}{2}\right)\sin\left(\frac{\Delta x_p k_x}{2}\right)}\right]. \quad (19)$$

In the embodiment illustrated in Equation (19), it is assumed that the matching spatial filter has been applied to the geophone data.

For aliased energy, the filter F' that should have been applied is:

$$F' = \frac{A'_p}{A'_v} \quad (20)$$

$$= \frac{N_v}{N_p}\left\{\frac{\sin\left[\frac{N_p\Delta x_p(2k_{Ny-x}-|k_x|)}{2}\right]\sin\left[\frac{\Delta x_v(2k_{Ny-x}-|k_x|)}{2}\right]}{\sin\left[\frac{N_v\Delta x_v(2k_{Ny-x}-|k_x|)}{2}\right]\sin\left[\frac{\Delta x_p(2k_{Ny-x}-|k_x|)}{2}\right]}\right\}.$$

Hence the correction factor $F_c$ that should be applied to the aliased part of the particle velocity data to account for the incorrect treatment of aliased energy by the array response matching step is the ratio given by:

$$F_c = \frac{F'}{F} \quad (21)$$

$$= \frac{\sin\left[\frac{N_p\Delta x_p(2k_{Ny-x}-|k_x|)}{2}\right]\sin\left[\frac{\Delta x_v(2k_{Ny-x}-|k_x|)}{2}\right]}{\sin\left[\frac{N_v\Delta x_v k_x}{2}\right]\sin\left[\frac{\Delta x_p k_x}{2}\right]} \cdot \frac{\sin\left[\frac{N_v\Delta x_v k_x}{2}\right]\sin\left[\frac{\Delta x_p k_x}{2}\right]}{\sin\left[\frac{N_v\Delta x_v(2k_{Ny-x}-|k_x|)}{2}\right]\sin\left[\frac{\Delta x_p(2k_{Ny-x}-|k_x|)}{2}\right]}.$$

To account for array response matching, the set of equations, analogous to Equations (3) and (7) to (9) above, that must be solved is revised as follows:

$$P = P_0 + P_1 \quad (22)$$

$$\tilde{V} = \tilde{V}_0 + \frac{\tilde{V}_1}{F_c} \quad (23)$$

-continued $$k_{z0}\cos(k_{z0}z_R)P_0 = \sin(k_{z0}z_R)\tilde{V}_0 \quad (24)$$

$$k_{z1}\cos(k_{z1}z_R)P_1 = \sin(k_{z1}z_R)\tilde{V}_1. \quad (25)$$

The solution, analogous to Equation (10) above, to the four unknowns $P_0$, $P_1$, $\tilde{V}_0$, and $\tilde{V}_1$ in Equations (22) to (25) is:

$$\begin{pmatrix} P_0 \\ P_1 \\ \tilde{V}_0 \\ \tilde{V}_1 \end{pmatrix} = \quad (26)$$

$$\frac{1}{D'}\begin{pmatrix} k_{z1}\sin(k_{z0}z_R)\cos(k_{z1}z_R) & -F_c\sin(k_{z0}z_R)\sin(k_{z1}z_R) \\ -F_ck_{z0}\cos(k_{z0}z_R)\sin(k_{z1}z_R) & F_c\sin(k_{z0}z_R)\sin(k_{z1}z_R) \\ k_{z0}k_{z1}\cos(k_{z0}z_R)\cos(k_{z1}z_R) & -F_ck_{z0}\cos(k_{z0}z_R)\sin(k_{z1}z_R) \\ -F_ck_{z0}k_{z1}\cos(k_{z0}z_R)\cos(k_{z1}z_R) & F_ck_{z1}\sin(k_{z0}z_R)\cos(k_{z1}z_R) \end{pmatrix}\begin{pmatrix} P \\ \tilde{V} \end{pmatrix},$$

where the denominator factor D in Equation (11) is replaced by the analogous denominator factor D', given by:

$$D'=k_{z1}\sin(k_{z0}z_R)\cos(k_{z1}z_R)-F_ck_{z0}\cos(k_{z0}z_R)\sin(k_{z1}z_R). \quad (27)$$

For values of the denominator factor D' in Equation (27) close to zero, the solution of Equation (26) becomes unstable. An approach for stabilizing the result can be adopted that is similar to that described above for Equation (10). This approach is discussed above with respect to Equations (16) and (17).

For 12.5 m channel separation and 1500 m/s sound propagation velocity, spatial aliasing starts at 60 Hz. In practice, this means that low-frequency geophone signal reconstruction is mostly immune to aliasing effects, but wavefield separation and redatuming are affected.

Figure 4:
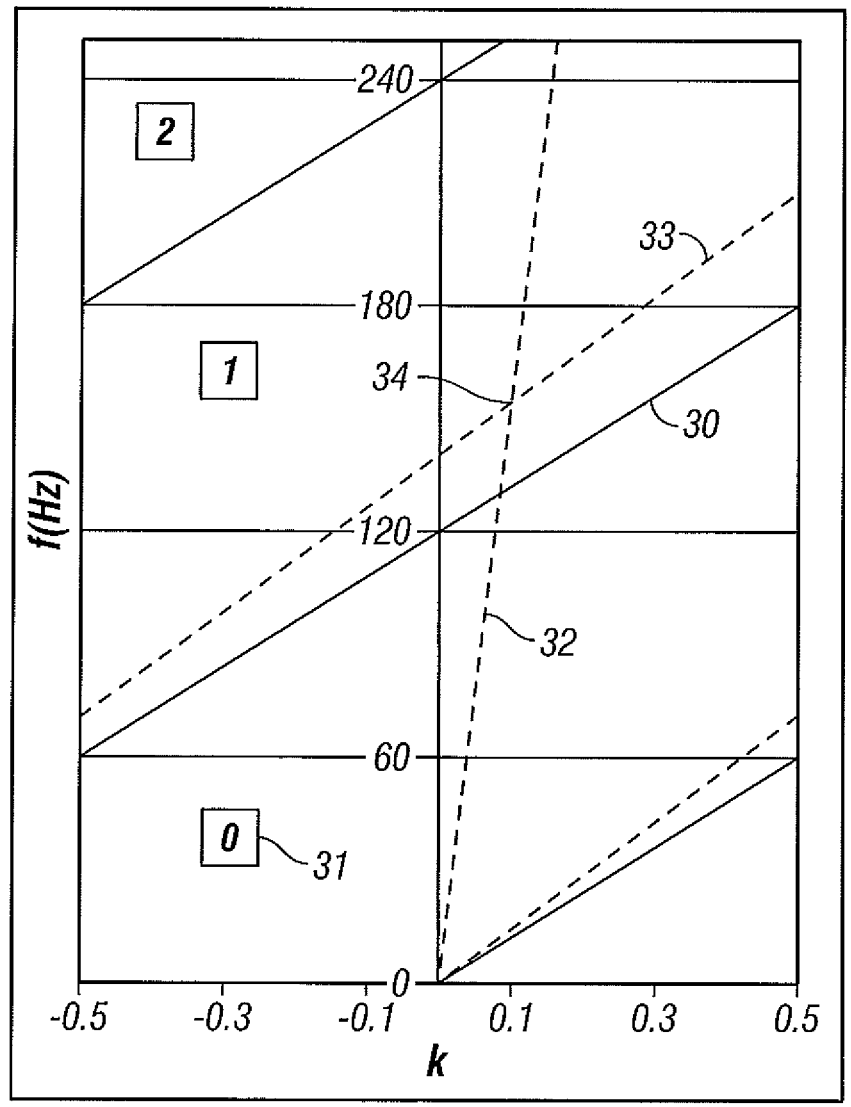
FIG. 4 is a plot of two plane wave events in a f-$k_x$ domain with no backscattered energy.

The invention allows first-order aliased energy to be treated correctly. Higher aliasing orders, denoted by numbers greater than 1 in FIG. 3 will not be treated correctly. However, a further simplifying assumption that can be made is to assume all the signal energy is scattered forward. This assumption means that there will not be aliasing orders higher than 1 below about 180 Hz. This is shown in FIG. 4, which is a plot of two plane wave events 32, 33 in a f-$k_x$ domain with no backscattered energy (FIG. 4 uses the same reference numerals as FIG. 3). Although any aliased backscattered energy will not be treated correctly, for the case of towed marine streamer acquisition, there is likely to be very little of this energy in practice. Using the convention that forward scattered energy maps to positive wavenumbers, the expression for $k_{z1}$ is changed from that in Equation (2) to the following:

$$k_{z1} = \sqrt{\left(\frac{\omega}{c}\right)^2 - (2k_{Ny}+k_x)^2}. \quad (28a)$$

If there is assumed to be no aliased back scattered energy, then Equation (28) is correct in the regions with aliasing orders up to 1, numbered 0 and 1 (designated by numbered boxes 31) in FIG. 4. Note that these areas in FIG. 4 represent a greater portion of the data than the corresponding areas in FIG. 3. In the 3-D case, the expression corresponding to Equation (28) is given by:

$$k_{z1} = \sqrt{\left(\frac{\omega}{c}\right)^2 - (2k_{Ny-x}+k_x)^2 - (2k_{Ny-y}+k_y)^2}. \quad (28b)$$

Figure 5:
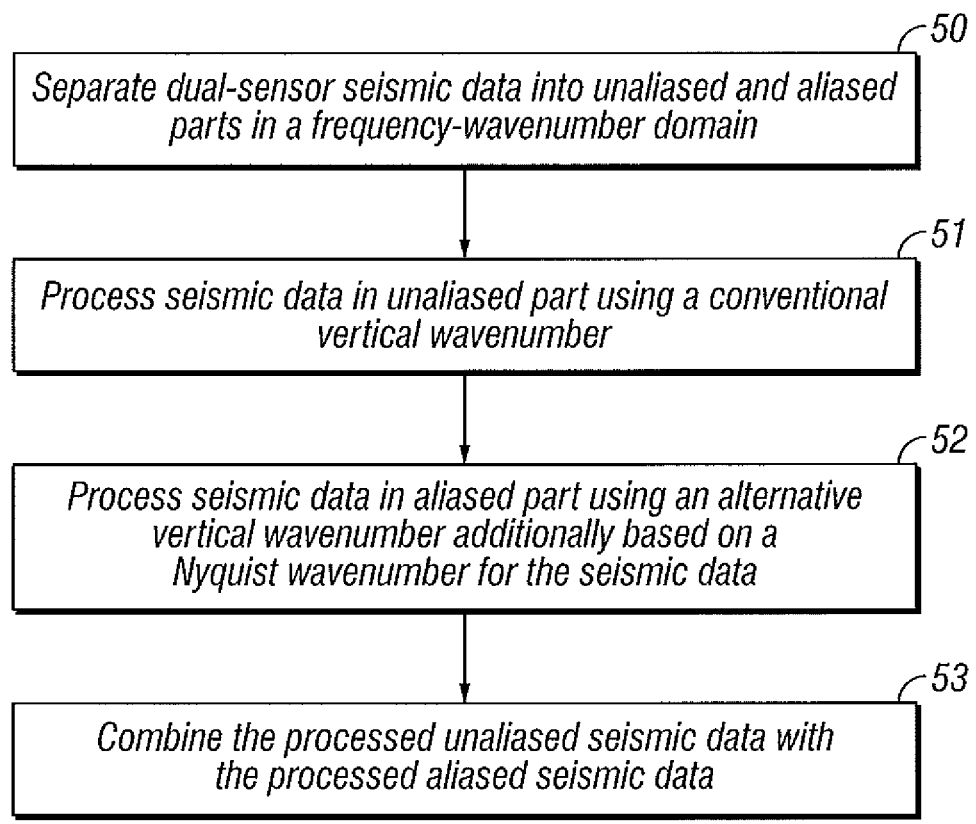
FIG. 5 is a flowchart illustrating an embodiment of the invention for geophysical prospecting.

FIG. 5 is a flowchart illustrating an embodiment of the invention for geophysical prospecting.

At block 50, dual-sensor seismic data are separated into aliased and unaliased parts in a frequency-wavenumber domain. In one embodiment, the dual-sensor seismic data comprises recorded pressure and particle velocity data. In a first embodiment, the separation is given by Equations (10) and (11). In a second embodiment, the separation is given by Equations (21), (26), and (27).

At block 51, the seismic data in the unaliased part from block 50 are processed using a conventional vertical wavenumber. In one embodiment, the conventional vertical wavenumber is given by Equation (1).

At block 52, the seismic data in the aliased part from block 50 are processed using an alternative vertical wavenumber additionally based on a Nyquist wavenumber for the seismic data. In one embodiment, the alternative vertical wavenumber is given by Equation (2). In an alternative embodiment, where it is assumed that all signal energy is scattered forward, the alternative vertical wavenumber is given by Equation (28). In various embodiments, the processing includes, but is not limited to, wavefield separation, redatuming, and applying a dip filter.

At block 53, the processed unaliased seismic data from block 51 and the processed aliased seismic data from block 52 are combined. The combined processed data may be transformed back into the space-time (x-t) domain for viewing and further processing.

FIGS. 6 to 17 illustrate the application of the method of the invention to wavefield separation for a synthetic dataset. FIGS. 6 to 12 show the results as seismic sections, while FIGS. 13 to 17 show the same results in the frequency-wavenumber domain.

The synthetic dataset generated comprised three planar events with emergence angles of 0°, 30°, and 60° simulated. Data were simulated for 12.5 m receiver separation and a 120 Hz low-pass filter, applied to ensure that there is no more than one order of aliasing (see FIG. 3), so that the assumptions of the method are satisfied.

Three datasets were created. First, a reference dataset with no ghost was created. Second, a hydrophone dataset was created by convolution of the reference dataset with a ghost function with a reflection coefficient of −1. Third, a geophone dataset was similarly created by convolution of the reference dataset with a ghost function with a reflection coefficient of +1 and further application of a scalar multiplier of cos(θ), for emergence angle θ, to simulate the vertical particle velocity component. The ghost period was calculated based on a receiver depth of 15 m for each emergence angle θ.

The hydrophone and geophone data were processed using both standard wavefield separation and wavefield separation according to the method of the invention, which handles aliasing. The up-going pressure field was produced by each method and then compared to a modeled reference for the up-going pressure field.

Figure 6:
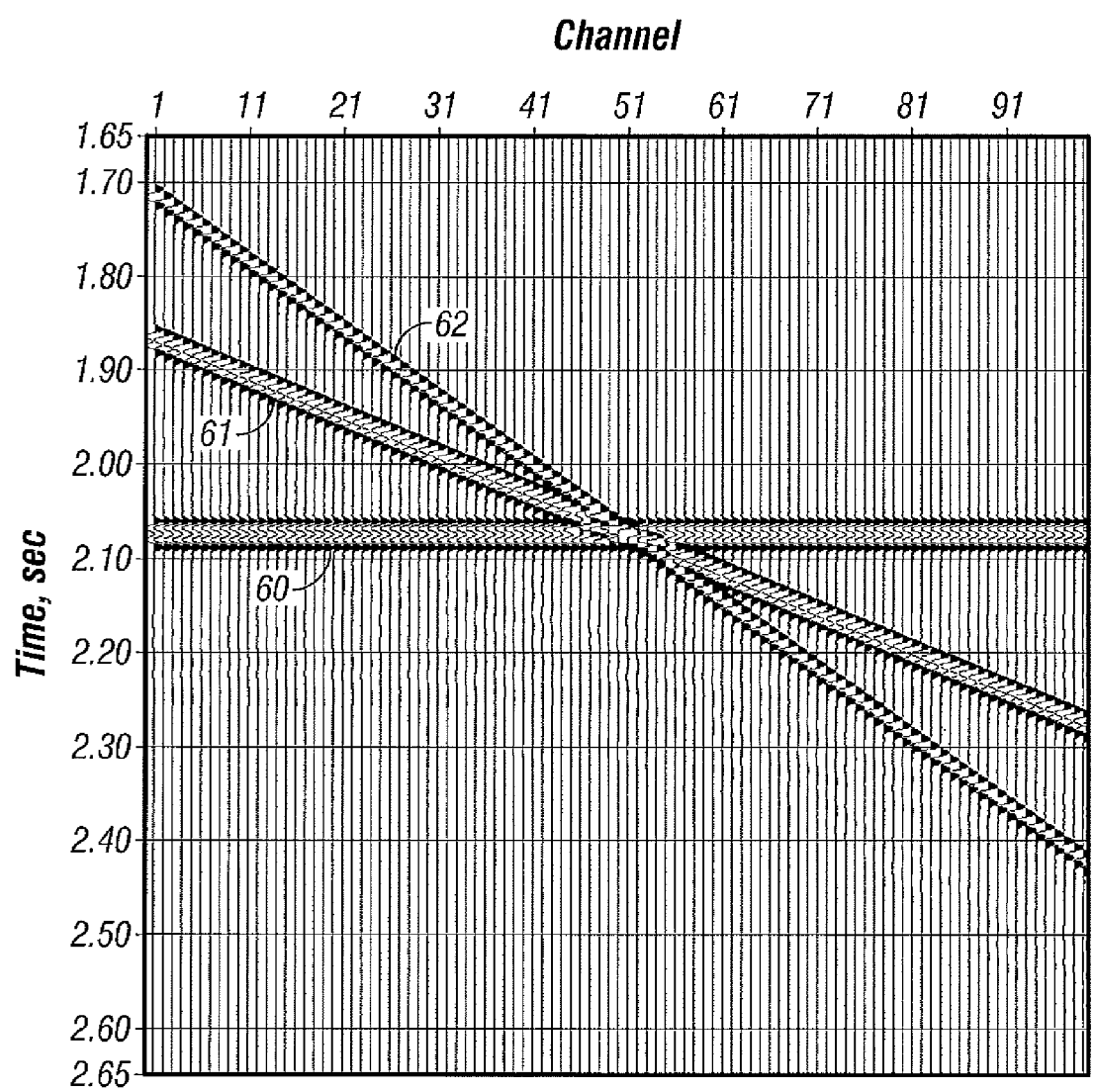
FIG. 6 is a seismic section of the modeled pressure data.
Figure 7:
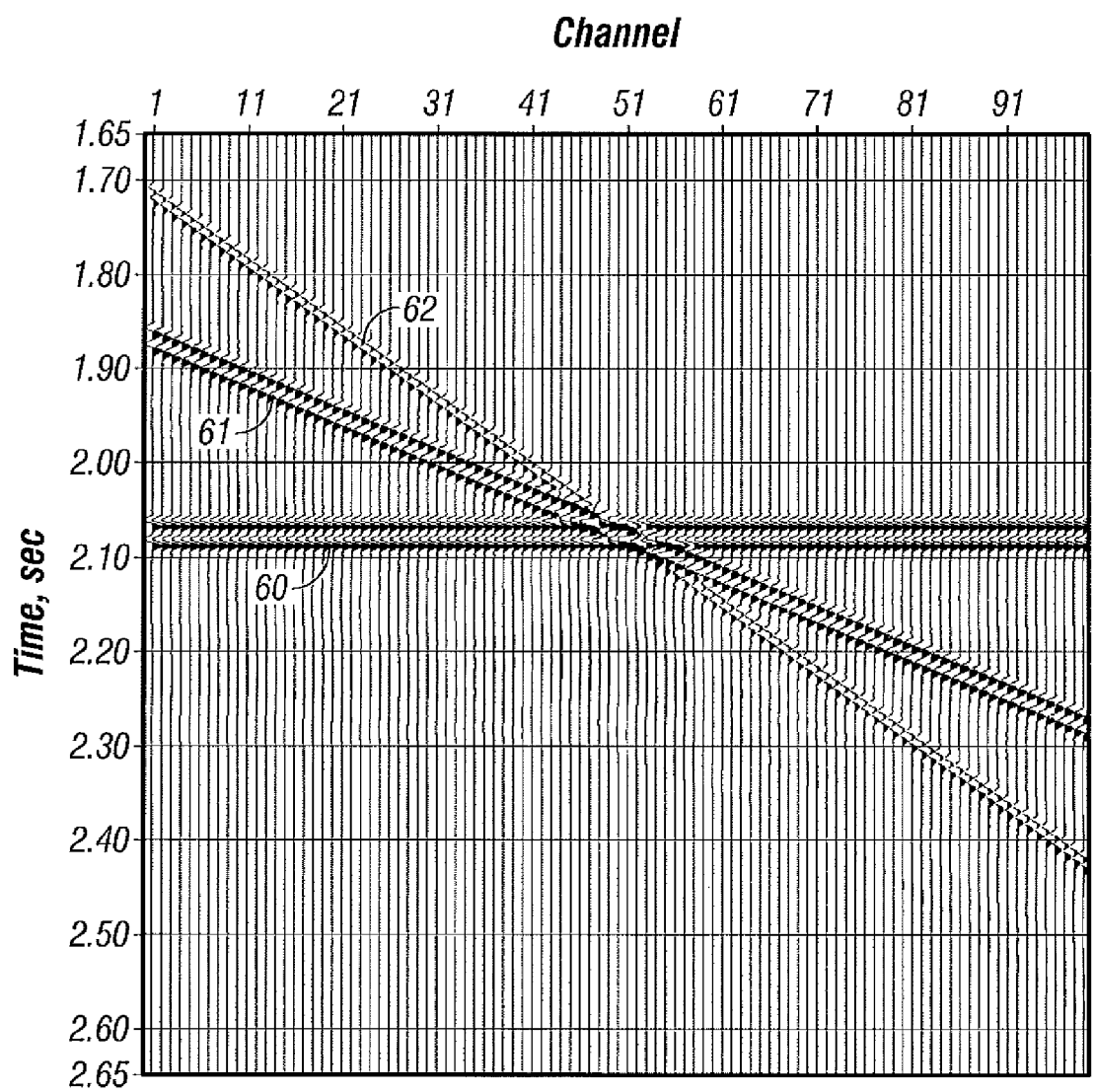
FIG. 7 is a seismic section of the modeled vertical particle velocity data.
Figure 8:
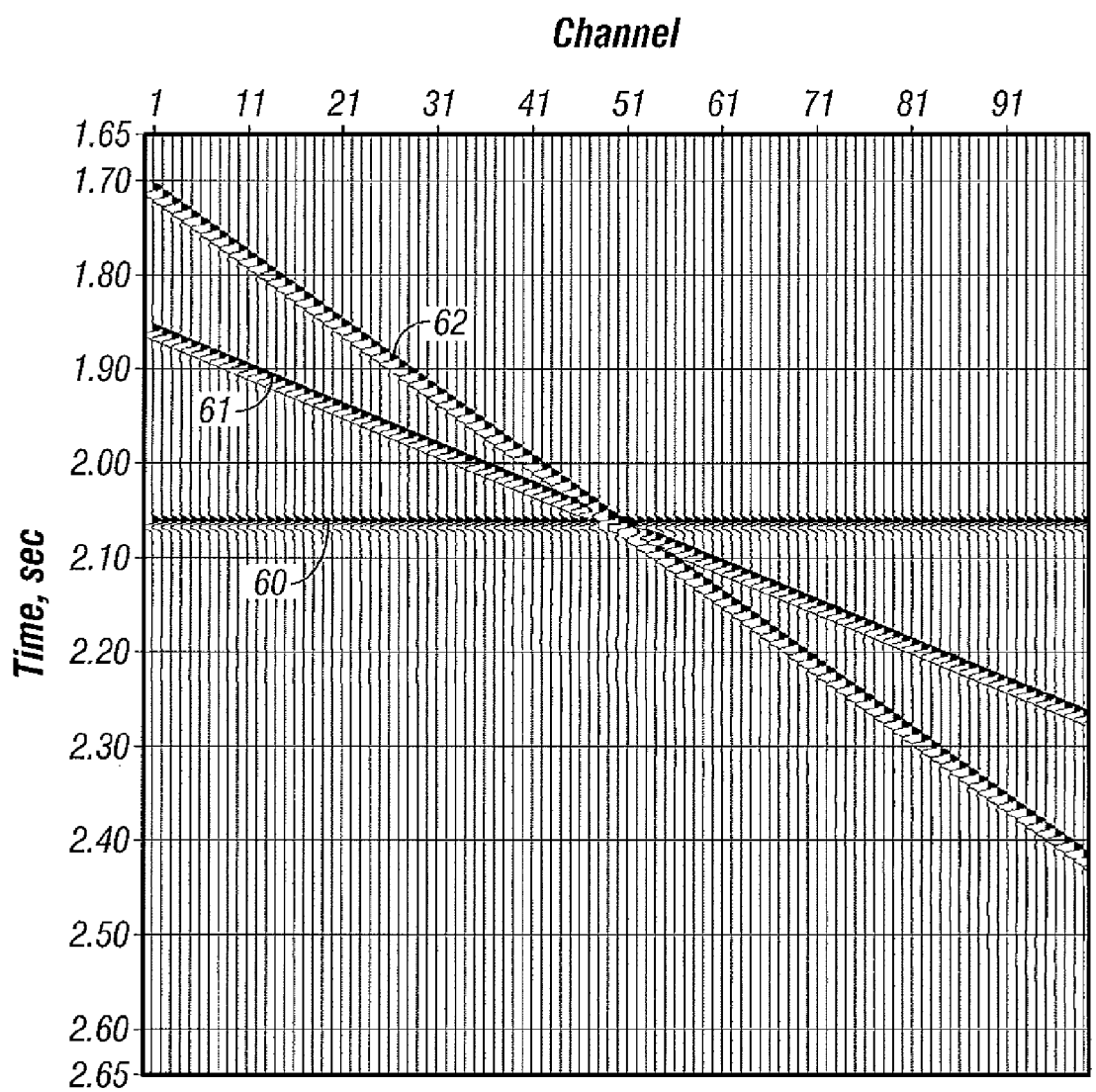
FIG. 8 is a seismic section of the modeled up-going pressure field that serves as the reference.

FIGS. 6 and 7 show seismic sections of the modeled pressure and vertical particle velocity data, respectively. FIG. 8 shows a seismic section of the modeled up-going pressure field that serves as the reference. The three planar events with emergence angles of 0°, 30°, and 60° are designated by reference numerals 60, 61, and 62, respectively, in FIGS. 6 to 17.

Figure 9:
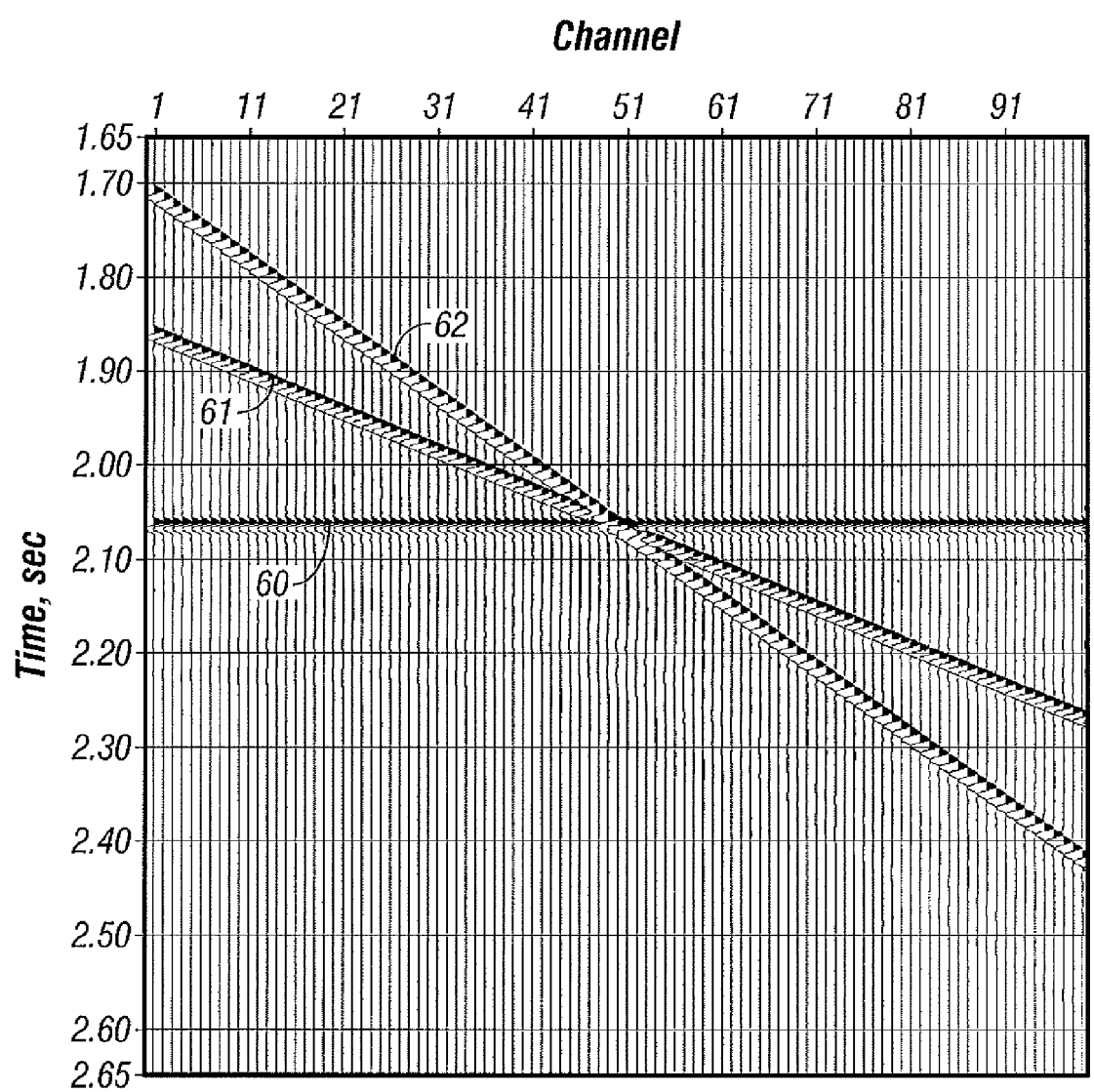
FIG. 9 is a seismic section of the up-going pressure field obtained from the input data in FIGS. 6 and 7 using standard wavefield separation.
Figure 10:
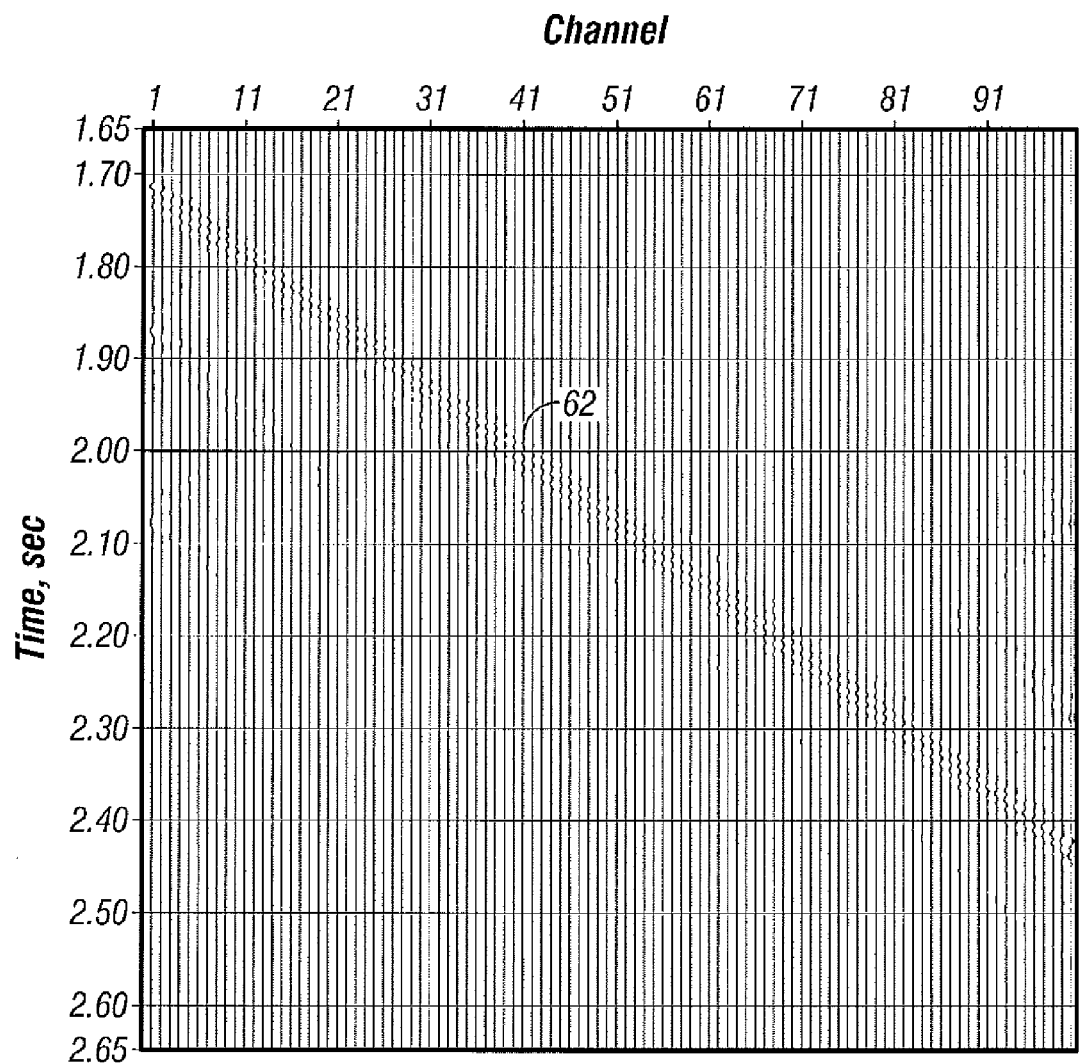
FIG. 10 is the difference between the up-going pressure wavefield for the standard wavefield separation in FIG. 9 and for the reference in FIG. 8.

FIG. 9 shows a seismic section of the up-going pressure field obtained from the input data in FIGS. 6 and 7 using standard wavefield separation techniques, i.e. no aliasing protection. FIG. 10 shows the residual, the difference between the up-going pressure wavefield for the standard wavefield separation and for the reference (FIG. 9 minus FIG. 8). Apart from f-k edge effects, the dominant feature is residual energy associated with the steepest event at 60°.

Figure 11:
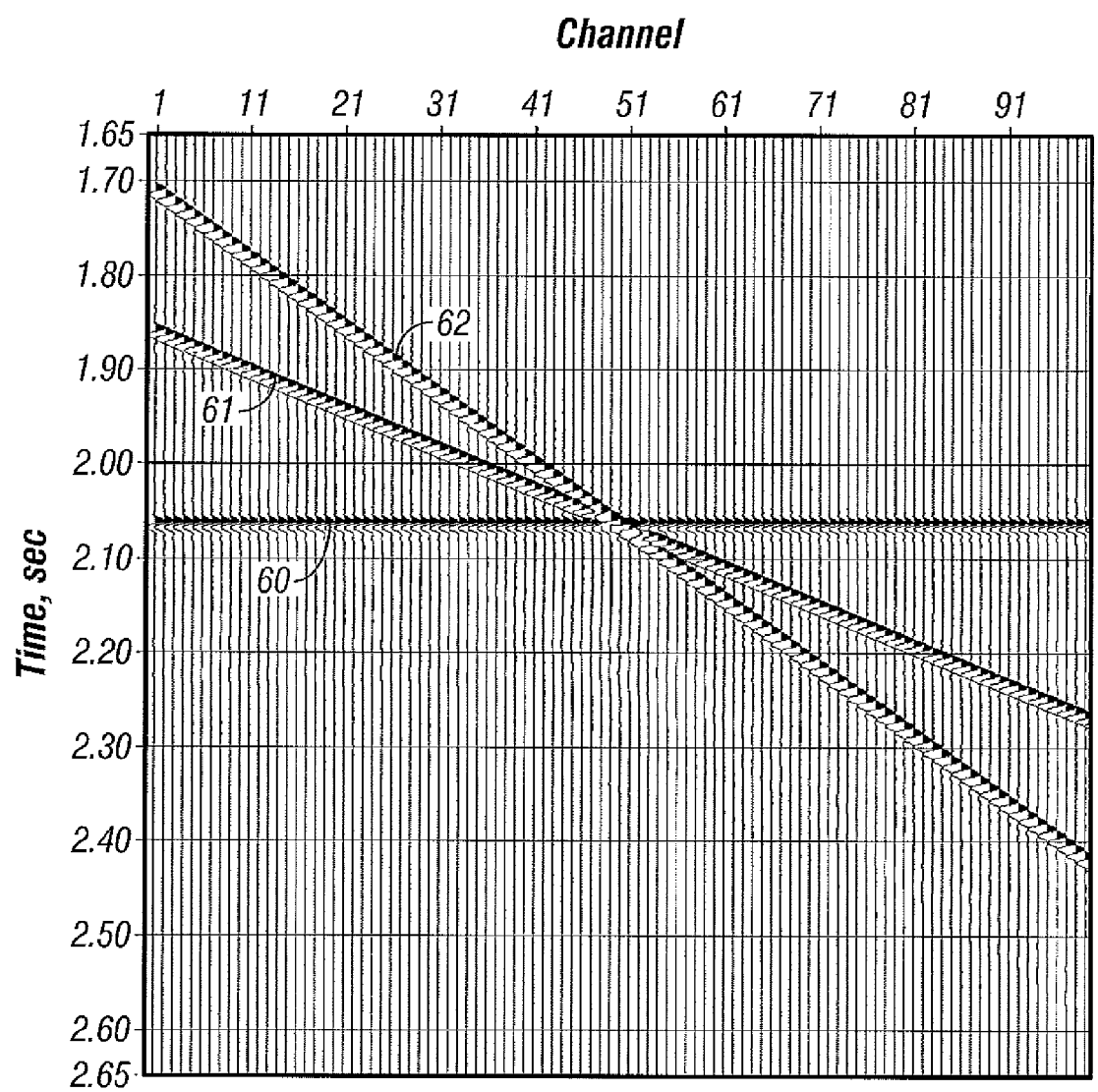
FIG. 11 shows the up-going pressure field obtained from the input data in FIGS. 6 and 7 using wavefield separation applying the method of the invention.
Figure 12:
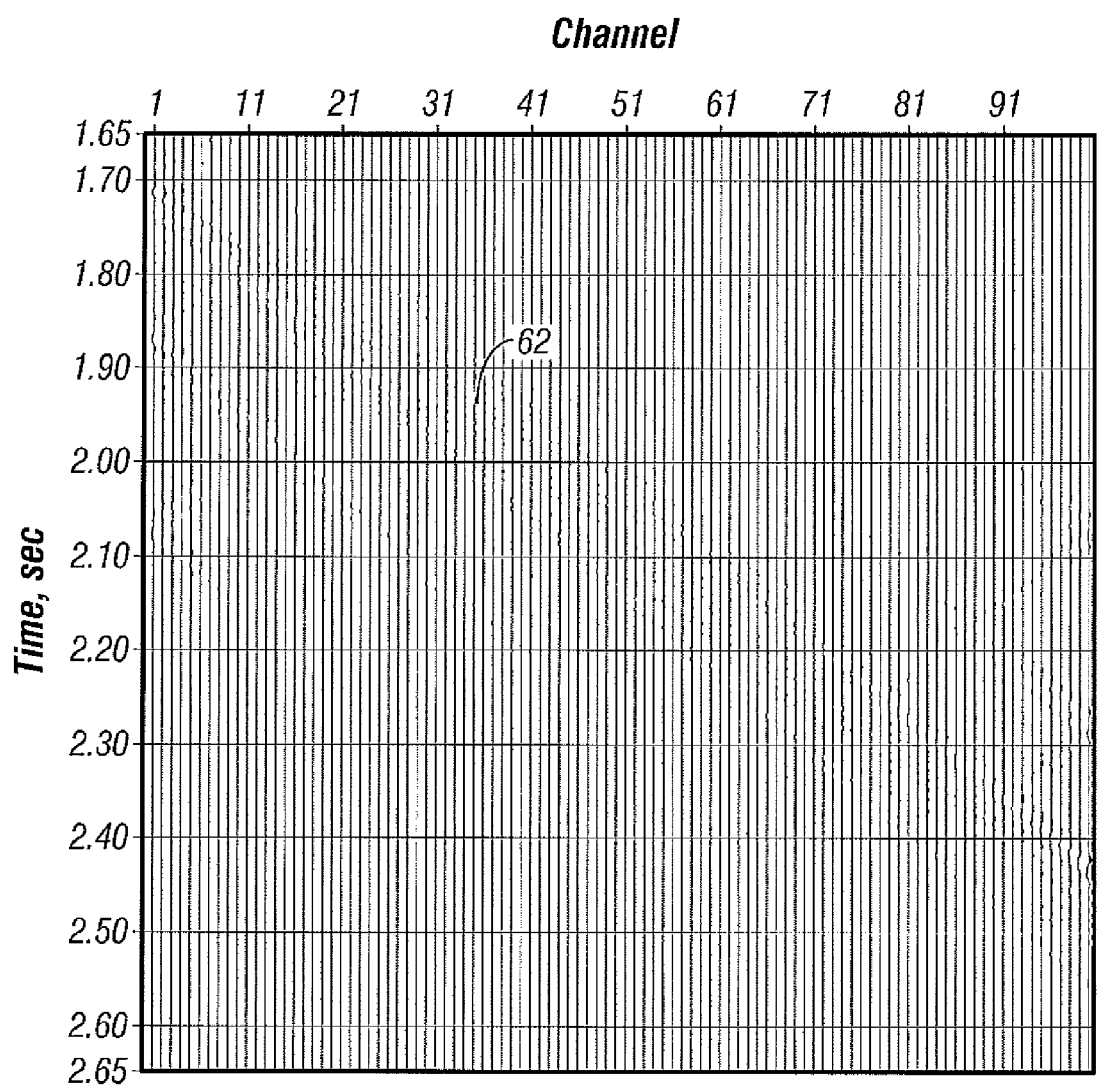
FIG. 12 is the difference between the up-going pressure wavefield for the wavefield separation applying the method of the invention in FIG. 11 and for the reference in FIG. 8.

FIG. 11 shows the up-going pressure field obtained from the input data in FIGS. 6 and 7 using wavefield separation applying the method of the invention. FIG. 12 shows the residual when the method of the invention is used (FIG. 11 minus FIG. 8), which demonstrates that the residual is significantly suppressed.

Figure 13:
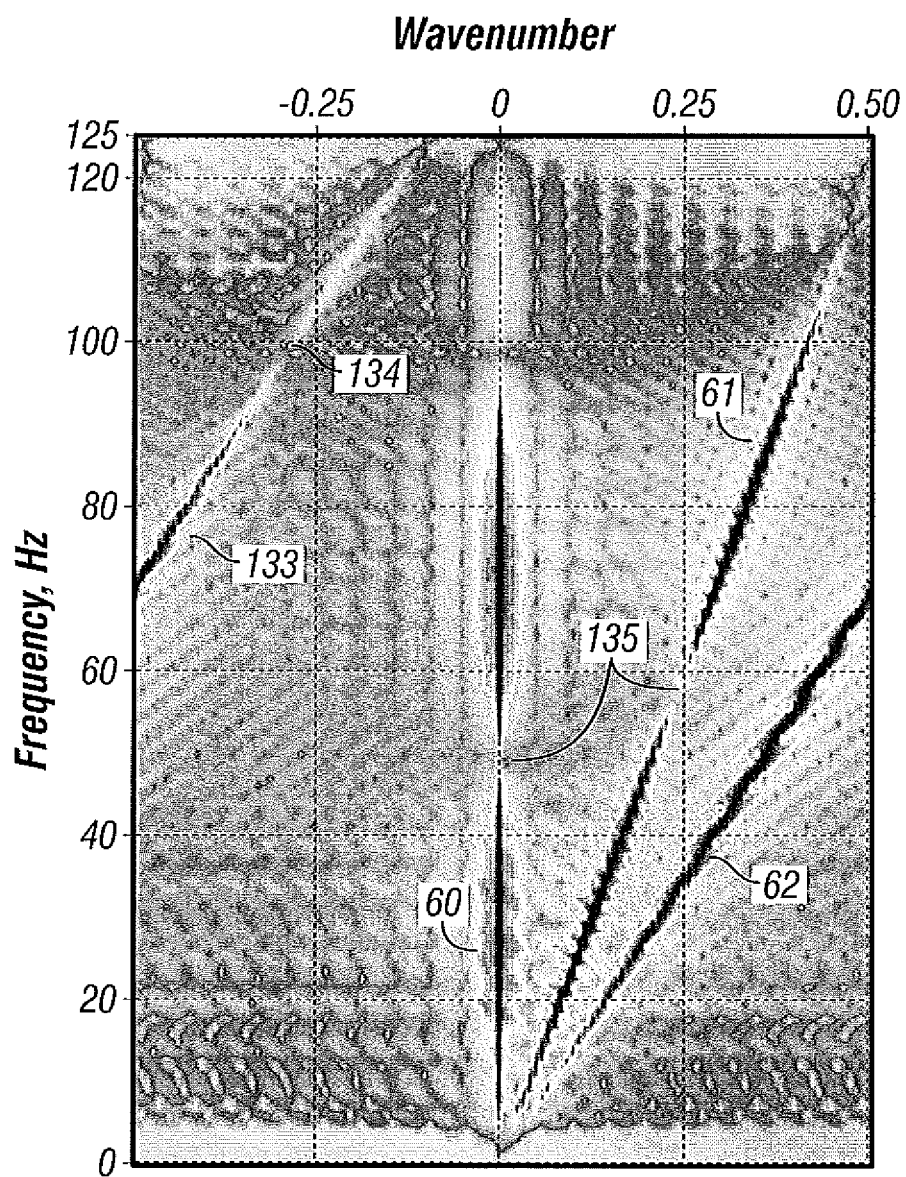
FIG. 13 is the modeled pressure data in a f-$k_x$ domain, which corresponds to the seismic section shown in FIG. 6.
Figure 14:
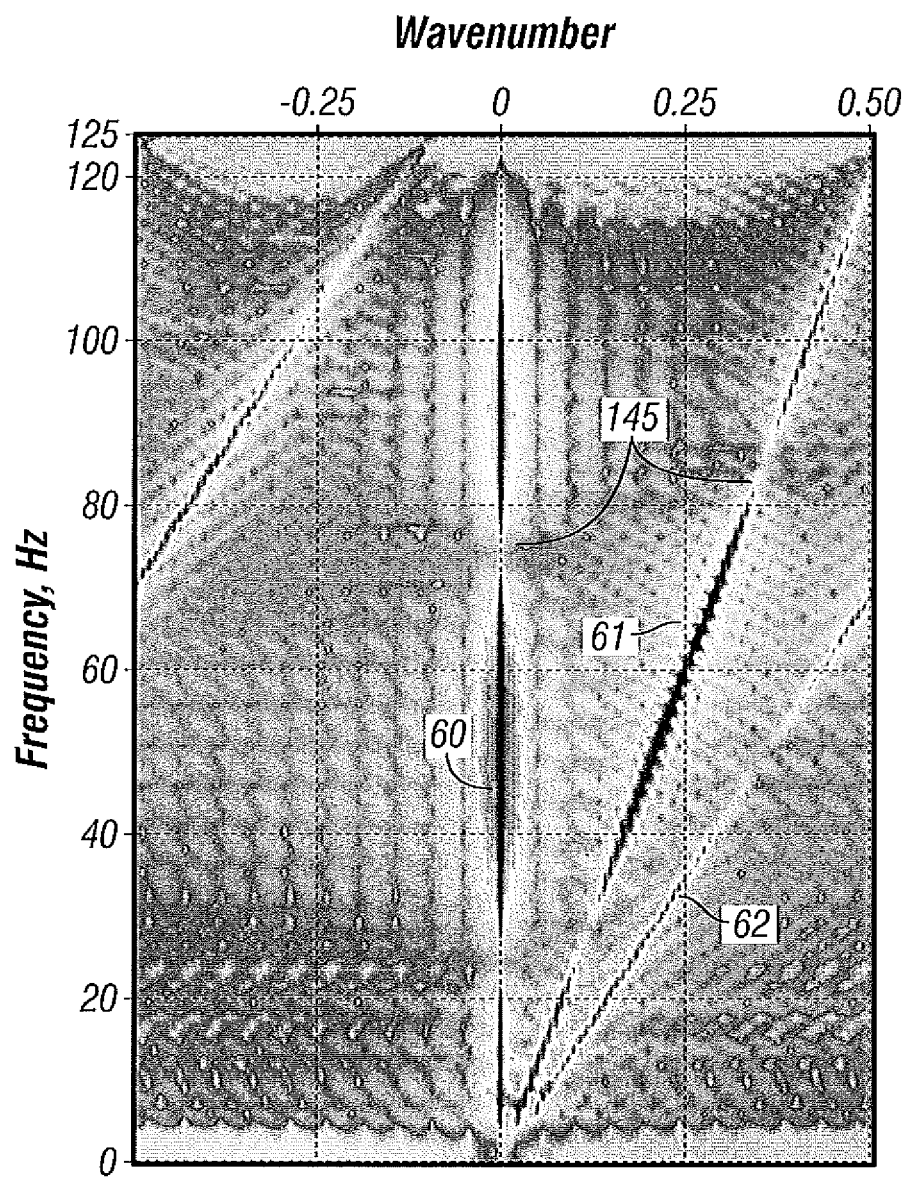
FIG. 14 is the modeled vertical particle velocity data in a f-$k_x$ domain, which corresponds to the seismic section shown in FIG. 7.
Figure 15:
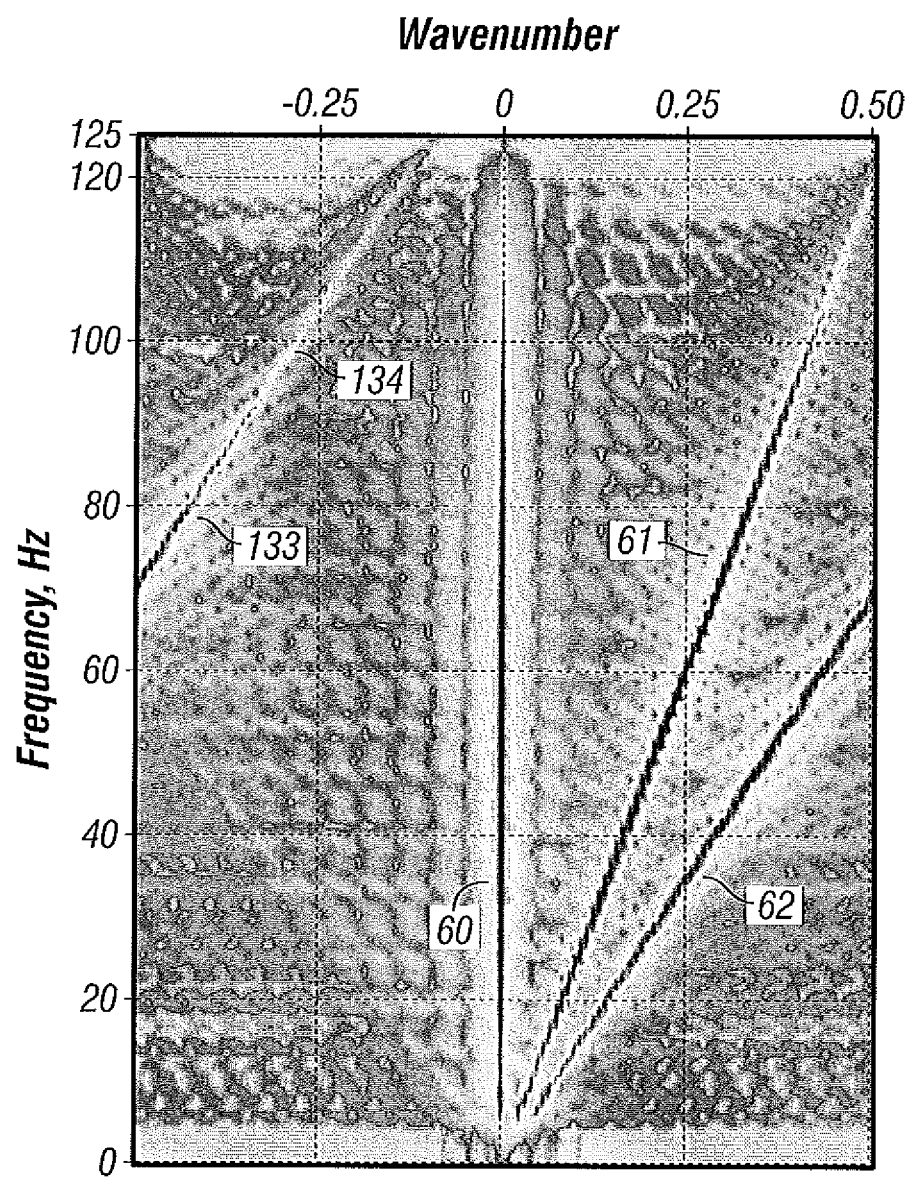
FIG. 15 is the modeled up-going pressure field reference in a f-$k_x$ domain, which corresponds to the seismic section in FIG. 8.

The reason for the residual in FIG. 10 is more apparent in the f-k domain, in the results as shown in FIGS. 13 to 17. FIGS. 13 and 14 show the modeled pressure and vertical particle velocity data, respectively, in the f-k domain. FIGS. 13 and 14 correspond to the seismic sections shown in FIGS. 6 and 7, respectively. FIG. 15 shows the modeled up-going pressure field reference in the f-k domain, which corresponds to the seismic section in FIG. 8.

Figure 16:
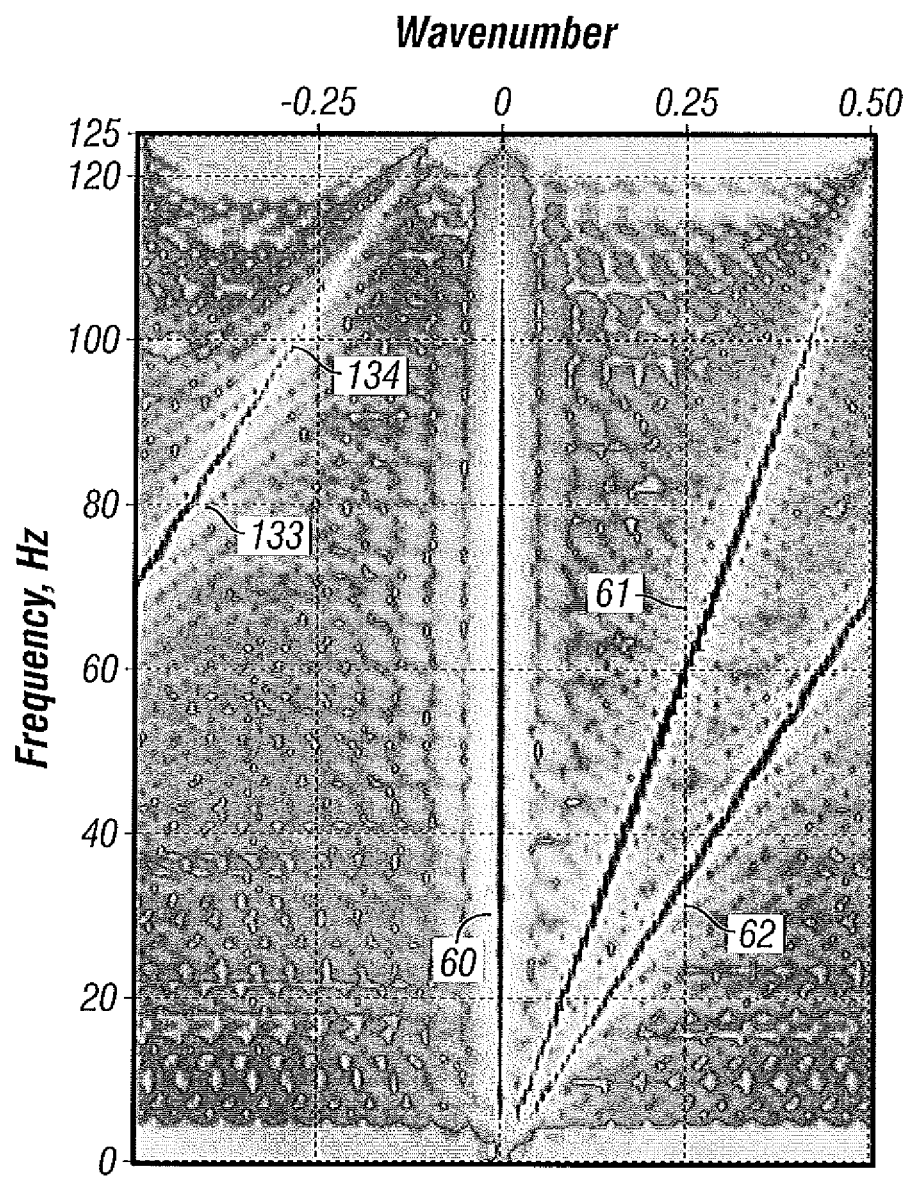
FIG. 16 shows the up-going pressure wavefield in a f-$k_x$ domain obtained from standard wavefield separation, corresponding to the seismic section in FIG. 9.

FIG. 16 shows the up-going pressure wavefield in the f-k domain obtained from standard wavefield separation, corresponding to the seismic section in FIG. 9. The up-going pressure field is derived by combining the hydrophone data (unsealed) with geophone data that has been scaled by an obliquity factor. For spatially aliased energy, this obliquity factor is incorrect.

FIG. 16 illustrates that the events 60, 61 with 0° and 30° emergence angle do not suffer from spatial aliasing below 120 Hz, hence the standard wavefield separation gives a near perfect result for these events. For the 60° event 62, the particle velocity data is scaled wrongly for the aliased part 133 when using the standard wavefield separation.

The result is errors in the up-going pressure field which are at a maximum at the hydrophone notch 134 in the aliased part 133, where the energy comes entirely from the geophone. At geophone notches (145 in FIG. 14), the energy is derived entirely from the hydrophone, so there is no error at these locations. At the other hydrophone notches 135 in the unaliased parts, there is also no error.

Figure 17:
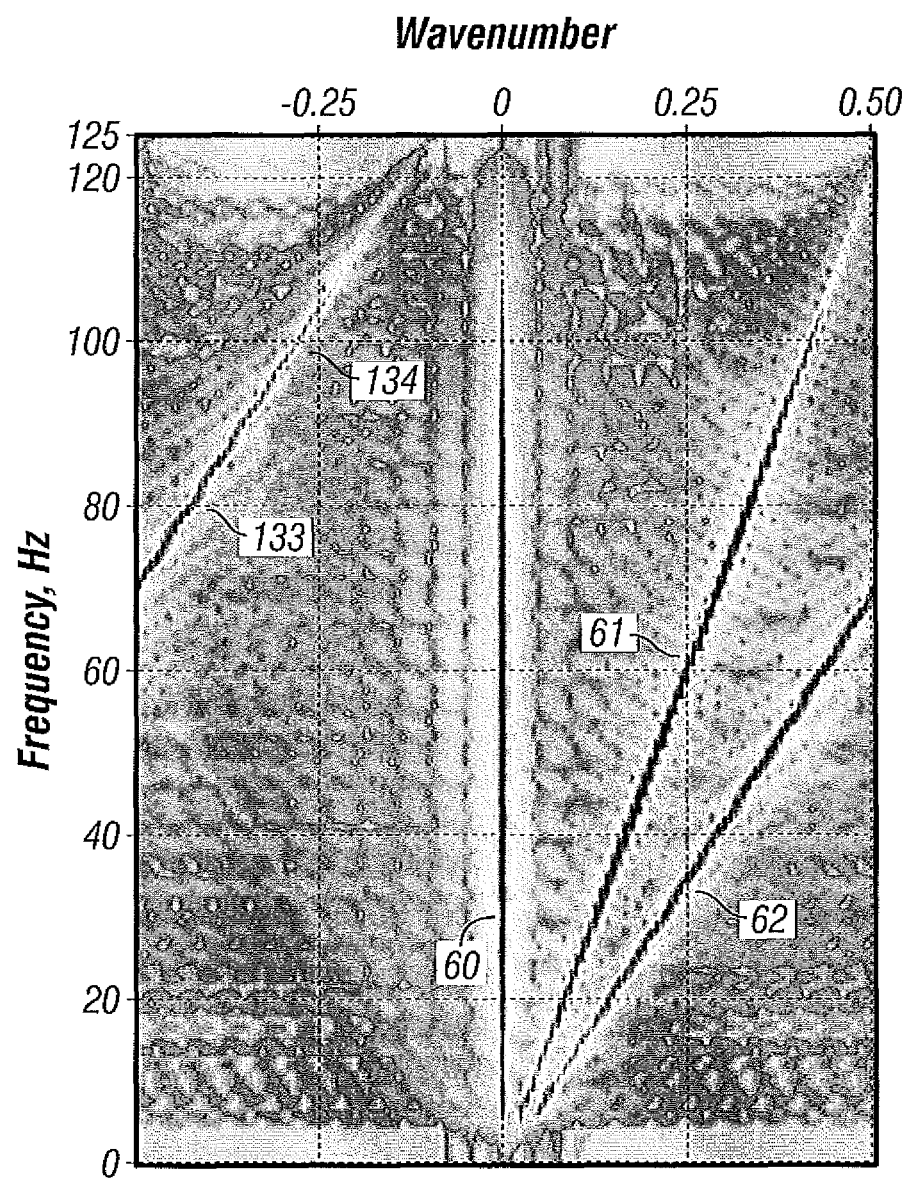
FIG. 17 is the up-going pressure wavefield in the f-$k_x$ domain obtained from wavefield separation applying the method of the invention, corresponding to the seismic section in FIG. 11.

FIG. 17 shows the up-going pressure wavefield in the f-k domain obtained from wavefield separation applying the method of the invention, corresponding to the seismic section in FIG. 11. When the method of the invention is used, the error in the hydrophone notch 134 in the aliased part 133 is greatly reduced compared to the standard wavefield separation shown in FIG. 16. These synthetic results indicate that the method of the invention handles first-order aliased energy better than standard processing.

For up to two orders of aliasing, the set of equations, analogous to Equations (3) and (7) to (9) above, that would be solved is revised as follows:

$$P = P_0 + P_1 + P_2 \quad (29)$$

$$\tilde{V} = \tilde{V}_0 + \tilde{V}_1 + \tilde{V}_2, \quad (30)$$

$$k_{z0} \cos(k_{z0} z_R) P_0 = \sin(k_{z0} z_R) \tilde{V}_0, \quad (31)$$

$$k_{z1} \cos(k_{z1} z_R) P_1 = \sin(k_{z1} z_R) \tilde{V}_1, \quad (32)$$

$$k_{z2} \cos(k_{z2} z_R) P_2 = \sin(k_{z2} z_R) \tilde{V}_2. \quad (33)$$

In Equation (33), $k_{z2}$ is an obliquity factor that is correct for second order aliased energy, analogous to those expressions for $k_{z1}$ in Equations (2a) or (2b) and (28a) or (28b). Similar obliquity factors can be determined for higher aliasing orders.

Equations (29) to (33) now yield a set of five equations in the six unknowns $P_0$, $P_1$, $P_2$, $\tilde{V}_0$, $\tilde{V}_1$, and $\tilde{V}_2$, and thus is an underdetermined system of equations. Thus, unfortunately, for each extra order of aliasing, only one extra equation and two extra unknowns are added, so that the problem becomes progressively more underdetermined. Thus, the method of the invention is a treatment of first order spatially aliased energy unless additional constraints (such as, for example, a minimum energy solution) can be applied to obtain a physically plausible separation of energy between different aliasing orders.

The seismic data obtained in performing a seismic survey, representative of earth's subsurface, are processed to yield information relating to the geologic structure and properties of the subsurface earth formations in the area being surveyed. The processed seismic data are processed for display and analysis of potential hydrocarbon content of these subterranean formations. The goal of seismic data processing is to extract from the seismic data as much information as possible regarding the subterranean formations in order to adequately image the geologic subsurface. In order to identify locations in the earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the earth's subsurface that will improve the ability of an interpreter, whether the interpretation is made by a computer or a human, to assess the probability that an accumulation of petroleum exists at a particular location in the earth's subsurface. The processing and display of acquired seismic data facilitates more accurate decisions on whether and where to drill, and thereby reduces the risk of drilling dry holes.

The invention has been discussed above as a method, for illustrative purposes only, but can also be implemented as a system. The system of the invention is preferably implemented by means of computers, in particular digital computers, along with other conventional data processing equipment, as illustrated in FIG. 2, above. Such data processing equipment, well known in the art, will comprise any appropriate combination or network of computer processing equipment, including, but not limited to, hardware (processors, temporary and permanent storage devices, and any other appropriate computer processing equipment), software (operating systems, application programs, mathematics program libraries, and any other appropriate software), connections (electrical, optical, wireless, or otherwise), and peripherals (input and output devices such as keyboards, pointing devices, and scanners; display devices such as monitors and printers; computer readable storage media such as tapes, disks, and hard drives, and any other appropriate equipment).

In another embodiment, the invention could be implemented as the method described above, specifically carried out using a programmable computer to perform the method. In another embodiment, the invention could be implemented as a computer program stored in a computer readable medium, with the program having logic operable to cause a programmable computer to perform the method described above. In another embodiment, the invention could be implemented as a computer readable medium with a computer program stored on the medium, such that the program has logic operable to cause a programmable computer to perform the method described above.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method to determine structural information about a geological subsurface, the method comprising:
   using a programmable computer to perform the following:
   separating dual-sensor seismic data into aliased and unaliased parts in a frequency-wavenumber domain;
   processing the seismic data in the unaliased part using a conventional vertical wavenumber;
   processing the seismic data in the aliased part using an alternative vertical wavenumber additionally based on a Nyquist wavenumber for the seismic data;
   combining the processed unaliased seismic data and the processed aliased seismic data; and
   generating an image of the geological subsurface using at least in part the combined processed unaliased and aliased seismic data, the image revealing structural information about the geological subsurface.

2. The method of claim 1, wherein the separating dual-sensor seismic data into aliased and unaliased parts comprises:
   imposing a free surface condition on the unaliased part of the seismic data using a conventional vertical wavenumber; and
   imposing a free surface condition on the aliased part of the seismic data using the an alternative vertical wavenumber.

3. The method of claim 2, wherein the conventional vertical wavenumber $k_{z0}$ comprises:

$$k_{z0} = \sqrt{\left(\frac{\omega}{c}\right)^2 - k_x^2 - k_y^2}$$

and the alternative vertical wavenumber $k_{z1}$ comprises:

$$k_{z1} = \sqrt{\left(\frac{\omega}{c}\right)^2 - (2k_{Ny-x} - |k_x|)^2 - (2k_{Ny-x} - |k_y|)^2},$$

where $\omega$ is circular frequency, c is speed of sound in water, $k_x$ and $k_y$ are orthogonal horizontal wavenumbers, and $k_{Ny-x}$ and $k_{Ny-y}$ are Nyquist wavenumbers in the inline and crossline directions, respectively for the seismic data.

4. The method of claim 2, wherein the conventional vertical wavenumber $k_{z0}$ comprises:

$$k_{z0} = \sqrt{\left(\frac{\omega}{c}\right)^2 - k_x^2 - k_y^2}$$

and the alternative vertical wavenumber $k_{z1}$ comprises:

$$k_{z1} = \sqrt{\left(\frac{\omega}{c}\right)^2 - (2k_{Ny-x} + k_x)^2 - (2k_{Ny-y} + k_y)^2},$$

where $\omega$ is circular frequency, c is speed of sound in water, $k_x$ and $k_y$ are orthogonal horizontal wavenumbers, and $k_{Ny-x}$ and $k_{Ny-y}$ are Nyquist wavenumbers in the inline and crossline directions, respectively for the seismic data.

5. The method of claim 2, wherein the conventional vertical wavenumber $k_{z0}$ comprises:

$$k_{z0} = \sqrt{\left(\frac{\omega}{c}\right)^2 - k_x^2}$$

and the alternative vertical wavenumber $k_{z1}$ comprises:

$$k_{z1} = \sqrt{\left(\frac{\omega}{c}\right)^2 - (2k_{Ny} - |k_x|)^2},$$

where $\omega$ is circular frequency, c is speed of sound in water, $k_x$ is horizontal wavenumber, and $k_{Ny}$ is Nyquist wavenumber for the seismic data.

6. The method of claim 2, wherein the conventional vertical wavenumber $k_{z0}$ comprises:

$$k_{z0} = \sqrt{\left(\frac{\omega}{c}\right)^2 - k_x^2}$$

and the alternative vertical wavenumber $k_{z1}$ comprises:

$$k_{z1} = \sqrt{\left(\frac{\omega}{c}\right)^2 - (2k_{Ny} + k_x)^2},$$

where $\omega$ is circular frequency, c is speed of sound in water, $k_x$ is horizontal wavenumber, and $k_{Ny}$ is Nyquist wavenumber for the seismic data.

7. The method of claim 2, wherein the separating the dual-sensor seismic data into aliased and unaliased portions of a frequency-wavenumber domain comprises applying the following equation:

$$\begin{pmatrix} P_0 \\ P_1 \\ \tilde{V}_0 \\ \tilde{V}_1 \end{pmatrix} = \frac{1}{D} \begin{pmatrix} k_{z1}\sin(k_{z0}z_R)\cos(k_{z1}z_R) & -\sin(k_{z0}z_R)\sin(k_{z1}z_R) \\ -k_{z0}\cos(k_{z0}z_R)\sin(k_{z1}z_R) & \sin(k_{z0}z_R)\sin(k_{z1}z_R) \\ k_{z0}k_{z1}\cos(k_{z0}z_R)\cos(k_{z1}z_R) & -k_{z0}\cos(k_{z0}z_R)\sin(k_{z1}z_R) \\ -k_{z0}k_{z1}\cos(k_{z0}z_R)\cos(k_{z1}z_R) & k_{z1}\sin(k_{z0}z_R)\cos(k_{z1}z_R) \end{pmatrix} \begin{pmatrix} P \\ \tilde{V} \end{pmatrix},$$

where $P_0$ and $P_1$ are an unaliased part and an aliased part, respectively, of recorded pressure P, $\tilde{V}_0$, and $\tilde{V}_1$ are a transformed unaliased part and a transformed aliased part, respectively, of transformed vertical particle velocity $\tilde{V}=-i\omega\rho V$, V is vertical particle velocity, $\rho$ is water density, $k_{z0}$ is the conventional vertical wavenumber, $k_{z1}$ is the alternative vertical wavenumber, $z_R$ is receiver depth, and denominator factor D is given by:

$$D=k_{z1}\sin(k_{z0}z_R)\cos(k_{z1}z_R)-k_{z0}\cos(k_{z0}z_R)\sin(k_{z1}z_R).$$

8. The method of claim 1, wherein the separating the dual-sensor seismic data into aliased and unaliased portions of a frequency-wavenumber domain further comprises
incorporating a correction factor to account for differences in receiver array geometry for the dual sensors.

9. The method of claim 8, wherein the separating the dual-sensor seismic data into aliased and unaliased portions of a frequency-wavenumber domain comprises applying the following equation:

$$\begin{pmatrix} P_0 \\ P_1 \\ \tilde{V}_0 \\ \tilde{V}_1 \end{pmatrix} = \frac{1}{D'}\begin{pmatrix} k_{z1}\sin(k_{z0}z_R)\cos(k_{z1}z_R) & -F_c\sin(k_{z0}z_R)\sin(k_{z1}z_R) \\ -F_ck_{z0}\cos(k_{z0}z_R)\sin(k_{z1}z_R) & F_c\sin(k_{z0}z_R)\sin(k_{z1}z_R) \\ k_{z0}k_{z1}\cos(k_{z0}z_R)\cos(k_{z1}z_R) & -F_ck_{z0}\cos(k_{z0}z_R)\sin(k_{z1}z_R) \\ -F_ck_{z0}k_{z1}\cos(k_{z0}z_R)\cos(k_{z1}z_R) & F_ck_{z1}\sin(k_{z0}z_R)\cos(k_{z1}z_R) \end{pmatrix}\begin{pmatrix} P \\ \tilde{V} \end{pmatrix},$$

where $P_0$ and $P_1$ are an unaliased part and an aliased part, respectively, of recorded pressure P, $\tilde{V}_0$, and $\tilde{V}_1$ are a transformed unaliased part and a transformed aliased part, respectively, of transformed vertical particle velocity $\tilde{V}=-i\omega\rho V$, V is vertical particle velocity, $\rho$ is water density, $k_{z0}$ is the conventional vertical wavenumber, $k_{z1}$ is the alternative vertical wavenumber, $z_R$ is receiver depth, denominator factor D' is given by:

$$D'=k_{z1}\sin(k_{z0}z_R)\cos(k_{z1}z_R)-F_ck_{z0}\cos(k_{z0}z_R)\sin(k_{z1}z_R),$$

and the correction factor $F_c$ is given by:

$$F_c = \frac{\sin\left[\frac{N_p\Delta x_p(2k_{Ny-x}-|k_x|)}{2}\right]\sin\left[\frac{\Delta x_v(2k_{Ny-x}-|k_x|)}{2}\right]}{\sin\left[\frac{N_v\Delta x_v k_x}{2}\right]\sin\left[\frac{\Delta x_p k_x}{2}\right]} \cdot \frac{\sin\left[\frac{N_v\Delta x_v(2k_{Ny-x}-|k_x|)}{2}\right]\sin\left[\frac{\Delta x_p(2k_{Ny-x}-|k_x|)}{2}\right]}{\sin\left[\frac{N_p\Delta x_p k_x}{2}\right]\sin\left[\frac{\Delta x_v k_x}{2}\right]},$$

where $N_p$ and $N_v$ are numbers of pressure and velocity sensors, respectively; $\Delta x_p$ and $\Delta x_v$, are pressure and velocity sensor spacing, respectively, $k_{Ny-x}$ is Nyquist wavenumber in the inline direction; and $k_x$ is horizontal wavenumber.

10. At least one computer readable medium with a computer program stored thereon, the program having logic operable to cause at least one programmable computer to perform a method that determines structural information about a geological subsurface, the method comprising:
separating dual-sensor seismic data into aliased and unaliased parts in a frequency-wavenumber domain;
processing the seismic data in the unaliased part using a conventional vertical wavenumber;
processing the seismic data in the aliased part using an alternative vertical wavenumber additionally based on a Nyquist wavenumber for the seismic data;
combining the processed unaliased seismic data and the processed aliased seismic data; and
generating an image of the geological subsurface using at least in part the combined processed unaliased and aliased seismic data, the image revealing structural information about the geological subsurface.

11. The medium of claim 10, wherein the separating dual-sensor seismic data into aliased and unaliased parts comprises:
imposing a free surface condition on the unaliased part of the seismic data using a conventional vertical wavenumber; and
imposing a free surface condition on the aliased part of the seismic data using the an alternative vertical wavenumber.

12. The medium of claim 11, wherein the conventional vertical wavenumber $k_{z0}$ comprises:

$$k_{z0} = \sqrt{\left(\frac{\omega}{c}\right)^2 - k_x^2 - k_y^2}$$

and the alternative vertical wavenumber $k_{z1}$ comprises:

$$k_{z1} = \sqrt{\left(\frac{\omega}{c}\right)^2 - (2k_{Ny-x}-|k_x|)^2 - (2k_{Ny-x}-|k_y|)^2},$$

where $\omega$ is circular frequency, c is speed of sound in water, $k_x$ and $k_y$ are orthogonal horizontal wavenumbers, and $k_{Ny-x}$ and $k_{Ny-y}$ are Nyquist wavenumbers in the inline and crossline directions, respectively for the seismic data.

13. The medium of claim 11, wherein the conventional vertical wavenumber $k_{z0}$ comprises:

$$k_{z0} = \sqrt{\left(\frac{\omega}{c}\right)^2 - k_x^2 - k_y^2}$$

and the alternative vertical wavenumber $k_{z1}$ comprises:

$$k_{z1} = \sqrt{\left(\frac{\omega}{c}\right)^2 - (2k_{Ny-x}+k_x)^2 - (2k_{Ny-x}+k_y)^2},$$

where $\omega$ is circular frequency, c is speed of sound in water, $k_x$ and $k_y$ are orthogonal horizontal wavenumbers, and $k_{Ny-x}$ and $k_{Ny-y}$ are Nyquist wavenumbers in the inline and crossline directions, respectively for the seismic data.

14. The medium of claim 11, wherein the conventional vertical wavenumber $k_{z0}$ comprises:

$$k_{z0} = \sqrt{\left(\frac{\omega}{c}\right)^2 - k_x^2}$$

and the alternative vertical wavenumber $k_{z1}$ comprises:

$$k_{z1} = \sqrt{\left(\frac{\omega}{c}\right)^2 - (2k_{Ny} - |k_x|)^2},$$

where $\omega$ is circular frequency, c is speed of sound in water, $k_x$ is horizontal wavenumber, and $k_{Ny}$ is Nyquist wavenumber for the seismic data.

15. The medium of claim 11, wherein the conventional vertical wavenumber $k_{z0}$ comprises:

$$k_{z0} = \sqrt{\left(\frac{\omega}{c}\right)^2 - k_x^2}$$

and the alternative vertical wavenumber $k_{z1}$ comprises:

$$k_{z1} = \sqrt{\left(\frac{\omega}{c}\right)^2 - (2k_{Ny} + k_x)^2},$$

where $\omega$ is circular frequency, c is speed of sound in water, $k_x$ is horizontal wavenumber, and $k_{Ny}$ is Nyquist wavenumber for the seismic data.

16. The medium of claim 11, wherein the separating the dual-sensor seismic data into aliased and unaliased portions of a frequency-wavenumber domain comprises applying the following equation:

$$\begin{pmatrix} P_0 \\ P_1 \\ \tilde{V}_0 \\ \tilde{V}_1 \end{pmatrix} = \frac{1}{D} \begin{pmatrix} k_{z1}\sin(k_{z0}z_R)\cos(k_{z1}z_R) & -\sin(k_{z0}z_R)\sin(k_{z1}z_R) \\ -k_{z0}\cos(k_{z0}z_R)\sin(k_{z1}z_R) & \sin(k_{z0}z_R)\sin(k_{z1}z_R) \\ k_{z0}k_{z1}\cos(k_{z0}z_R)\cos(k_{z1}z_R) & -k_{z0}\cos(k_{z0}z_R)\sin(k_{z1}z_R) \\ -k_{z0}k_{z1}\cos(k_{z0}z_R)\cos(k_{z1}z_R) & k_{z1}\sin(k_{z0}z_R)\cos(k_{z1}z_R) \end{pmatrix} \begin{pmatrix} P \\ \tilde{V} \end{pmatrix},$$

where $P_0$ and $P_1$ are an unaliased part and an aliased part, respectively, of recorded pressure P, $\tilde{V}_0$, and $\tilde{V}_1$ are a transformed unaliased part and a transformed aliased part, respectively, of transformed vertical particle velocity $\tilde{V}=-i\omega\rho V$, V is vertical particle velocity, $\rho$ is water density, $k_{z0}$ is the conventional vertical wavenumber, $k_{z1}$ is the alternative vertical wavenumber, $z_R$ is receiver depth, and denominator factor D is given by:

$$D = k_{z1}\sin(k_{z0}z_R)\cos(k_{z1}z_R) - k_{z0}\cos(k_{z0}z_R)\sin(k_{z1}z_R).$$

17. The medium of claim 10, wherein the separating the dual-sensor seismic data into aliased and unaliased portions of a frequency-wavenumber domain further comprises incorporating a correction factor to account for differences in receiver array geometry for the dual sensors.

18. The medium of claim 17, wherein the separating the dual-sensor seismic data into aliased and unaliased portions of a frequency-wavenumber domain comprises applying the following equation:

$$\begin{pmatrix} P_0 \\ P_1 \\ \tilde{V}_0 \\ \tilde{V}_1 \end{pmatrix} =$$

$$\frac{1}{D'} \begin{pmatrix} k_{z1}\sin(k_{z0}z_R)\cos(k_{z1}z_R) & -F_c\sin(k_{z0}z_R)\sin(k_{z1}z_R) \\ -F_c k_{z0}\cos(k_{z0}z_R)\sin(k_{z1}z_R) & F_c\sin(k_{z0}z_R)\sin(k_{z1}z_R) \\ k_{z0}k_{z1}\cos(k_{z0}z_R)\cos(k_{z1}z_R) & -F_c k_{z0}\cos(k_{z0}z_R)\sin(k_{z1}z_R) \\ -F_c k_{z0}k_{z1}\cos(k_{z0}z_R)\cos(k_{z1}z_R) & F_c k_{z1}\sin(k_{z0}z_R)\cos(k_{z1}z_R) \end{pmatrix} \begin{pmatrix} P \\ \tilde{V} \end{pmatrix},$$

where $P_0$ and $P_1$ are an unaliased part and an aliased part, respectively, of recorded pressure P, $\tilde{V}_0$, and $\tilde{V}_1$ are a transformed unaliased part and a transformed aliased part, respectively, of transformed vertical particle velocity $\tilde{V}=-i\omega\rho V$, V is vertical particle velocity, $\rho$ is water density, $k_{z0}$ is the conventional vertical wavenumber, $k_{z1}$ is the alternative vertical wavenumber, $z_R$ is receiver depth, denominator factor D' is given by:

$$D' = k_{z1}\sin(k_{z0}z_R)\cos(k_{z1}z_R) - F_c k_{z0}\cos(k_{z0}z_R)\sin(k_{z1}z_R),$$

and the correction factor $F_c$ is given by:

$$F_c = \frac{\sin\left[\frac{N_p \Delta x_p(2k_{Ny-x}-|k_x|)}{2}\right] \sin\left[\frac{\Delta x_v(2k_{Ny-x}-|k_x|)}{2}\right]}{\sin\left[\frac{N_v \Delta x_v k_x}{2}\right] \sin\left[\frac{\Delta x_p k_x}{2}\right]} \cdot \frac{\sin\left[\frac{N_v \Delta x_v(2k_{Ny-x}-|k_x|)}{2}\right] \sin\left[\frac{\Delta x_p(2k_{Ny-x}-|k_x|)}{2}\right]}{\sin\left[\frac{N_p \Delta x_p k_x}{2}\right] \sin\left[\frac{\Delta x_v k_x}{2}\right]},$$

where $N_p$ and $N_v$ are numbers of pressure and velocity sensors, respectively; $\Delta x_p$ and $\Delta x_v$, are pressure and velocity sensor spacing, respectively, $k_{Ny-x}$ is Nyquist wavenumber in the inline direction; and $k_x$ is horizontal wavenumber.

* * * * *